(12) United States Patent
Leung et al.

(10) Patent No.: US 12,538,039 B2
(45) Date of Patent: *Jan. 27, 2026

(54) SYSTEMS AND METHODS FOR GATE-BASED VEHICLE IMAGE CAPTURE

(71) Applicant: QUANATA, LLC, San Francisco, CA (US)

(72) Inventors: Theobolt N. Leung, San Francisco, CA (US); Vinay Kumar, Fremont, CA (US); Holger Struppek, San Francisco, CA (US); Scott Howard, Emeryville, CA (US); Kenneth J. Sanchez, San Francisco, CA (US); John Minichiello, Normal, IL (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,829

(22) Filed: Mar. 28, 2024

(65) Prior Publication Data

US 2024/0267640 A1 Aug. 8, 2024

Related U.S. Application Data

(63) Continuation of application No. 17/838,870, filed on Jun. 13, 2022, now Pat. No. 11,949,999, which is a
(Continued)

(51) Int. Cl.
*G06K 9/00* (2022.01)
*G06Q 40/08* (2012.01)
(Continued)

(52) U.S. Cl.
CPC ............ *H04N 23/90* (2023.01); *G06Q 40/08* (2013.01); *G06T 7/0002* (2013.01);
(Continued)

(58) Field of Classification Search
CPC .... G05D 1/0274; G06Q 10/0833; G06T 7/74; G06T 5/006; G06T 7/50; A62F 13/577;
(Continued)

(56) References Cited

U.S. PATENT DOCUMENTS 7,813,944 B1 10/2010 Luk et al.
8,117,049 B2 2/2012 Berkobin et al.
(Continued)

FOREIGN PATENT DOCUMENTS

CN 103810637 5/2014
WO 2017176304 10/2017

OTHER PUBLICATIONS

Jiangqin Peng, Nanjie Lui, Haitao Zhao and Minglu Yu, "Usage-based insurance system based on carrier-cloud-client," 2015 10th International Conference on Communication and Networking in China (ChinaCom), 2015 pp. 579-584, (Usage) 2015.
(Continued)

*Primary Examiner* — Phuoc H Doan
(74) *Attorney, Agent, or Firm* — BRYAN CAVE LEIGHTON PAISNER LLP

(57) ABSTRACT

A gate-based vehicle image capture system for analyzing vehicle image data is presented. The system may include a portable imaging gate apparatus configured to capture vehicle image data of a vehicle. The portable imaging gate apparatus may include a plurality of imaging assemblies positioned at a plurality of viewing angles. The system may further include an external processing server configured to receive the vehicle image data from the portable imaging gate apparatus. The external processing server may also analyze the vehicle image data to identify a plurality of vehicle features, and determine a first vehicle feature from the plurality of vehicle features. The first vehicle feature may be related to a vehicle incident. The system may also
(Continued)

include a provider server configured to receive the first vehicle feature from the external processing server, and update an aspect of a risk evaluation based on the first vehicle feature.

19 Claims, 17 Drawing Sheets

Related U.S. Application Data continuation of application No. 16/667,759, filed on Oct. 29, 2019, now Pat. No. 11,388,351.

(51) Int. Cl.
  *G06T 7/00* (2017.01)
  *H04N 23/90* (2023.01)
  *G03B 17/56* (2021.01)
  *H04N 23/50* (2023.01)

(52) U.S. Cl.
  CPC .. *G03B 17/561* (2013.01); *G06T 2207/30252* (2013.01); *H04N 23/555* (2023.01)

(58) Field of Classification Search
  CPC .......... A63F 13/77; A63F 13/56; A63F 13/75; G06N 20/00; G08G 9/02; B60W 10/04; G06F 16/9537
  See application file for complete search history.

(56) References Cited

U.S. PATENT DOCUMENTS

| | | |
|---|---|---|
| 9,047,778 B1 | 6/2015 | Cazanas et al. |
| 9,151,692 B2 | 10/2015 | Breed |
| 9,275,417 B2 | 3/2016 | Binion et al. |
| 9,299,108 B2 | 3/2016 | Diana et al. |
| 9,311,676 B2 | 4/2016 | Helitzer et al. |
| 9,679,487 B1 | 6/2017 | Hayward |
| 9,712,549 B2 | 7/2017 | Almurayh |
| 9,870,448 B1 | 1/2018 | Myers et al. |
| 9,904,928 B1 | 2/2018 | Leise |
| 9,984,419 B1 | 5/2018 | Manzella et al. |
| 9,984,420 B1 | 5/2018 | Manzella et al. |
| 10,026,130 B1 | 7/2018 | Konrardy et al. |
| 10,032,225 B1 | 7/2018 | Fox et al. |
| 10,042,359 B1 | 8/2018 | Konrardy et al. |
| 10,055,794 B1 | 8/2018 | Konrardy et al. |
| 10,086,782 B1 | 10/2018 | Konrardy et al. |
| 10,089,693 B1 | 10/2018 | Konrardy et al. |
| 10,102,590 B1 | 10/2018 | Farnsworth et al. |
| 10,106,083 B1 | 10/2018 | Fields et al. |
| 10,127,737 B1 | 11/2018 | Manzella et al. |
| 10,134,278 B1 | 11/2018 | Konrardy et al. |
| 10,156,848 B1 | 12/2018 | Konrardy et al. |
| 10,157,423 B1 | 12/2018 | Fields et al. |
| 10,163,327 B1 | 12/2018 | Potter et al. |
| 10,163,350 B1 | 12/2018 | Fields et al. |
| 10,166,994 B1 | 1/2019 | Fields et al. |
| 10,168,703 B1 | 1/2019 | Konrardy et al. |
| 10,181,161 B1 | 1/2019 | Konrardy et al. |
| 10,185,997 B1 | 1/2019 | Konrardy et al. |
| 10,185,998 B1 | 1/2019 | Konrardy et al. |
| 10,185,999 B1 | 1/2019 | Konrardy et al. |
| 10,210,678 B1 | 2/2019 | Manzella et al. |
| 10,269,074 B1 | 4/2019 | Patel et al. |
| 10,295,363 B1 | 5/2019 | Konrardy et al. |
| 10,354,333 B1 | 7/2019 | Hayward |
| 10,410,289 B1 | 9/2019 | Tofte et al. |
| 10,534,968 B1 | 1/2020 | Clauss et al. |
| 10,643,287 B1 | 5/2020 | Manzella et al. |
| 10,832,327 B1 | 11/2020 | Potter et al. |
| 11,216,888 B2 | 1/2022 | Perl et al. |
| 11,417,208 B1 | 8/2022 | Leung et al. |
| 2003/0200123 A1 | 10/2003 | Burge et al. |
| 2004/0243423 A1 | 12/2004 | Rix et al. |
| 2008/0077451 A1* | 3/2008 | Anthony ................ G06Q 10/10 705/4 |
| 2008/0243558 A1 | 10/2008 | Gupte |
| 2010/0088123 A1 | 4/2010 | Mccall et al. |
| 2010/0145734 A1 | 6/2010 | Becerra et al. |
| 2012/0076437 A1 | 3/2012 | King |
| 2013/0166326 A1* | 6/2013 | Lavie ..................... G06Q 40/08 705/4 |
| 2013/0317665 A1 | 11/2013 | Fernandes et al. |
| 2013/0317736 A1 | 11/2013 | Fernandes et al. |
| 2014/0081675 A1 | 3/2014 | Ives et al. |
| 2015/0025917 A1 | 1/2015 | Stempora |
| 2015/0039397 A1 | 2/2015 | Fuchs |
| 2015/0179062 A1 | 6/2015 | Ralston et al. |
| 2015/0204684 A1 | 7/2015 | Rostamian et al. |
| 2015/0363886 A1 | 12/2015 | Fernandes et al. |
| 2016/0001544 A1 | 1/2016 | Gydesen |
| 2017/0013228 A1* | 1/2017 | Kalendra ............. G11B 31/006 |
| 2017/0075740 A1 | 3/2017 | Breaux et al. |
| 2017/0089710 A1 | 3/2017 | Slusar |
| 2017/0109827 A1 | 4/2017 | Huang et al. |
| 2017/0192428 A1 | 7/2017 | Vogt et al. |
| 2017/0200367 A1 | 7/2017 | Mielenz |
| 2017/0212511 A1 | 7/2017 | Paiva et al. |
| 2017/0270615 A1 | 9/2017 | Fernandes et al. |
| 2017/0270617 A1 | 9/2017 | Fernandes et al. |
| 2017/0293894 A1 | 10/2017 | Taliwal et al. |
| 2018/0070290 A1 | 3/2018 | Breaux et al. |
| 2018/0070291 A1 | 3/2018 | Breaux et al. |
| 2018/0182039 A1 | 6/2018 | Wang et al. |
| 2018/0194343 A1 | 7/2018 | Lorenz |
| 2018/0307250 A1 | 10/2018 | Harvey |
| 2019/0102840 A1 | 4/2019 | Perl et al. |
| 2021/0042844 A1 | 2/2021 | Potter et al. |
| 2021/0078629 A1 | 3/2021 | Boss et al. |

OTHER PUBLICATIONS

<https://gilsmethod.com/how-to-create-albums-and-upload-pictures-to-facebook-on-your-iphone>. GilsMethod, Oct. 15, 2019. 2019.

<https://grytics.com/blog/create-album-facebook-groups/>. Grytics. Oct. 15, 2019. 2019.

<https://www.dummies.com/social-media/facebook/how-to-edit-a-facebook-album/>. Dummies. Oct. 15, 2019. 2019.

<https://www.socmedsean.com/updated-facebook-tip-organizing-moving-and-editing-your-photos-and-albums/. SocMedSean. Ocotober 15, 2019. 2019.

<https://www.thesocialmediahat.com/blog/how-to-update-your-new-mobile-facebook-profile/>. The Social Media Hat. Oct. 15, 2019. 2019.

Aleksandrowicz, P., Verification of motor vehicle post accident insurance claims. University of Science and Technology, Institute of Automation and Transport, Machine Maintenance Department, vol. 15, No. 1, 2020, pp. 25-38. 2020.

fidelity.com, "Mobile Check Deposit", Deposit checks on the go. Just snap a photo of the check with your iPhone (Registered), iPad(Registered), or AndroidTM device to make deposits directly into the Fidelity account of your choice, Copyright 1998-2019 FMR LLC, pp. 1-2. Retrieved from the internet on Aug. 15, 2019: https://www.fidelity.com/mobile-check-deposit 2019.

leadtools.com, "Credit Card Recognition SOK Technology", Copyright 2019 LEAD Technologies, Inc, pp. 1-2. Retrieved from the internet on Aug. 15, 2019: https://www.leadtools.com/sdk/forms/credit-card 2019.

Li et al., An Anti-Fraud System for Car Insurance Claim Based on Visual Evidence, retrieved from https://arxiv.org/pdf/1804.11207, Apr. 2018, 6 pages. 2018.

Ruchi Verma and Sathyan Ramakrishana Mani, "Using Analytics for Insurance Fraud Detection", Digital Transformation, pp. 1-10.

truepic.com, "Photo and Video Verification You Can Trust", 2019 World Economic Forum Tech Pioneer, pp. 1-4. Retrieved from the internet on Aug. 15, 2019: https://truepic.com/ 2019.

* cited by examiner

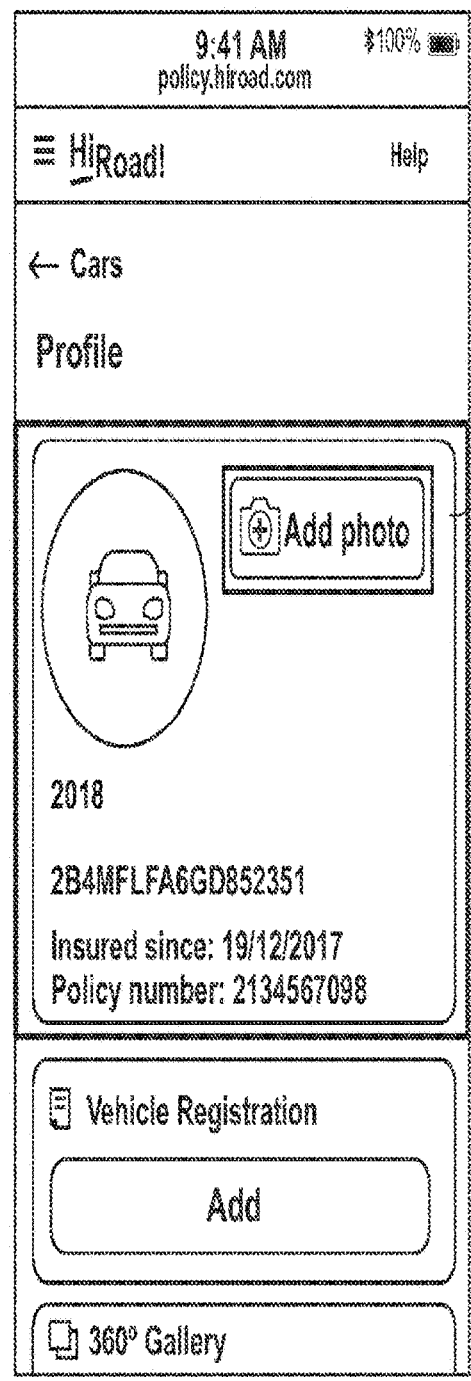
FIG. 3E
FIG. 3F

SYSTEMS AND METHODS FOR GATE-BASED VEHICLE IMAGE CAPTURE

CROSS-REFERENCE TO RELATED APPLICATIONS

This application is a continuation of U.S. patent application Ser. No. 17/838,870, filed Jun. 13, 2022, which is a continuation of U.S. patent application Ser. No. 16/667,759, filed Oct. 29, 2019, each of which is hereby incorporated by reference in their entirety.

FIELD OF THE DISCLOSURE

The present disclosure generally relates to gate-based vehicle image capture and, more particularly, to systems and methods for analyzing vehicle image data captured by a portable imaging gate apparatus to update a risk evaluation.

BACKGROUND

As a general principle of risk evaluation, high-fidelity data describing the evaluated individual or item is of the utmost importance. Thanks to advances in wireless technology, such high-fidelity data may be gathered locally in a myriad of locations. For example, local data collection with regard to vehicle imaging may take place at locations featuring conventional imaging capabilities. However, the type of data that can be gathered with these conventional capabilities is limited.

Conventional techniques for local data collection for vehicles involve stationary imaging apparatuses. Many conventional techniques utilize imaging apparatuses positioned at a fixed location to examine the vehicle through a variety of side and overhead exterior imaging perspectives. However, such conventional techniques suffer from a variety of issues.

Notably, many of these conventional techniques for local data collection for vehicles suffer from a lack of accessibility and completeness of data. In some cases, the stationary imaging apparatuses featured in many conventional techniques require users to travel great distances to utilize their capabilities. Moreover, the data acquired by such conventional techniques are limited in their ability to capture data beyond the side and overhead exteriors of the vehicle.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a gate-based vehicle image capture system for analyzing vehicle image data may be provided. The system may include a portable imaging gate apparatus configured to capture vehicle image data of a vehicle, wherein the portable imaging gate apparatus includes a plurality of imaging assemblies positioned at a plurality of viewing angles. The system may also include an external processing server configured to receive the vehicle image data from the portable imaging gate apparatus, analyze the vehicle image data to identify a plurality of vehicle features, and determine a first vehicle feature from the plurality of vehicle features, wherein the first vehicle feature is related to a vehicle incident. The system may also include a provider server configured to receive the first vehicle feature from the external processing server, and update an aspect of a risk evaluation based on the first vehicle feature.

In another embodiment, a vehicle image data analysis method for analyzing gate-based vehicle image capture may be provided. The method may include capturing, by a portable imaging gate apparatus, vehicle image data of a vehicle, wherein the vehicle image data is representative of a plurality of viewing angles of the vehicle; analyzing, by an external processing server, the vehicle image data to identify a plurality of vehicle features; determining, by the external processing server, a first vehicle feature from the plurality of vehicle features, wherein the first vehicle feature is related to a vehicle incident; and updating, by a provider server, an aspect of a risk evaluation based on the first vehicle feature.

In yet another embodiment, a computer readable storage medium comprising non-transitory computer readable instructions stored thereon for analyzing gate-based vehicle image data may be provided. The instructions when executed on one or more processors may cause the one or more processors to receive vehicle image data from a portable imaging gate apparatus, wherein the vehicle image data is representative of a plurality of viewing angles of a vehicle; analyze the vehicle image data to identify a plurality of vehicle features; determine a first vehicle feature from the plurality of vehicle features, wherein the first vehicle feature is related to a vehicle incident; and update an aspect of a risk evaluation based on the first vehicle feature.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Figure 1:
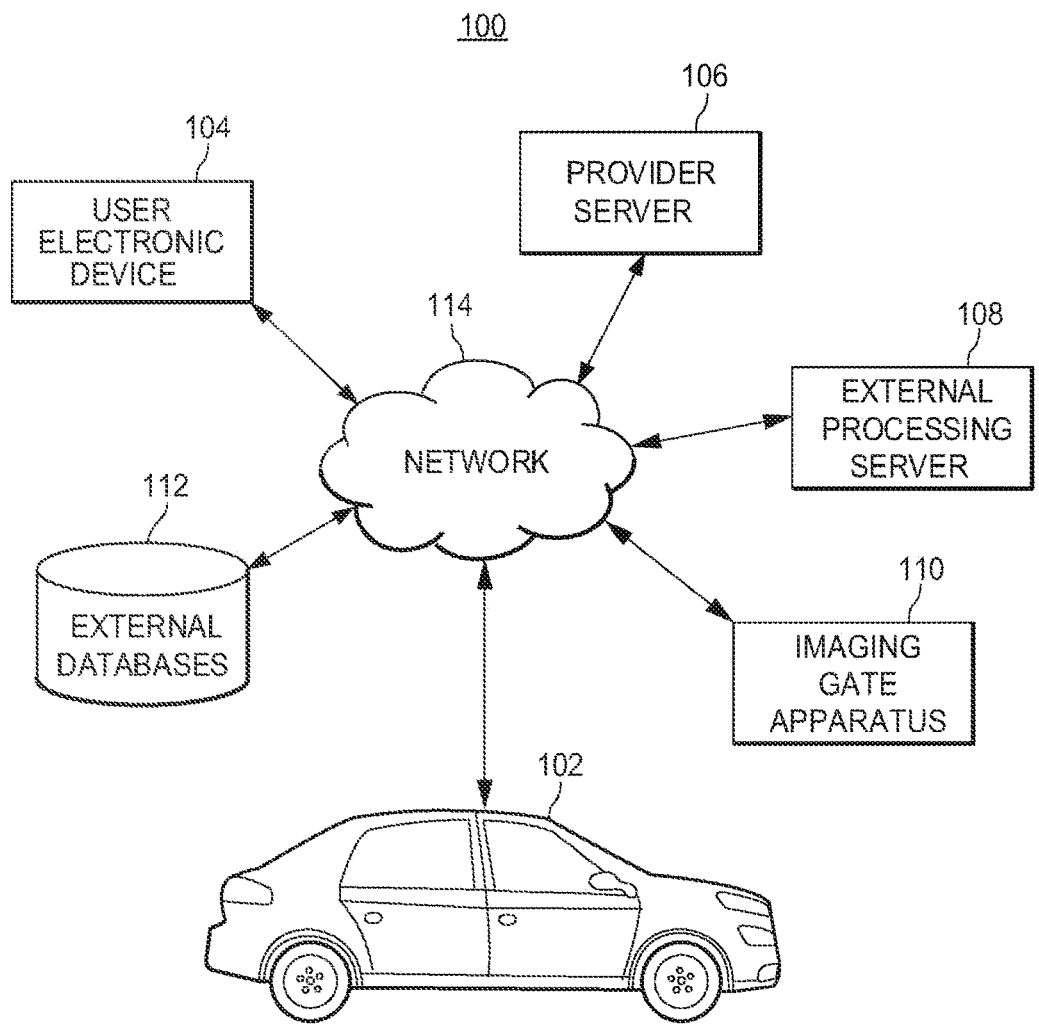
FIG. 1 illustrates an example system for analyzing vehicle image data captured by a portable imaging gate apparatus.

I. Example Systems and Related Functionality for Analyzing Vehicle Image Data Captured by a Portable Imaging Gate Apparatus FIG. 1 illustrates an example system 100 for analyzing vehicle image data captured by a portable imaging gate apparatus. The example system 100 may include a vehicle 102, a user electronic device 104, an provider server 106, an external processing server 108, an imaging gate apparatus 110 (also referenced herein as "portable imaging gate apparatus" and "image capture device"), external databases 112, and a network 114. While illustrated in FIG. 1 as a single external database, in some embodiments the external databases 112 includes two or more external databases. The network 114 may be a computer network of an insurance provider (e.g., provided or used by the insurance provider or communications over which the insurance provider otherwise controls or facilitates).

Figure 2A:
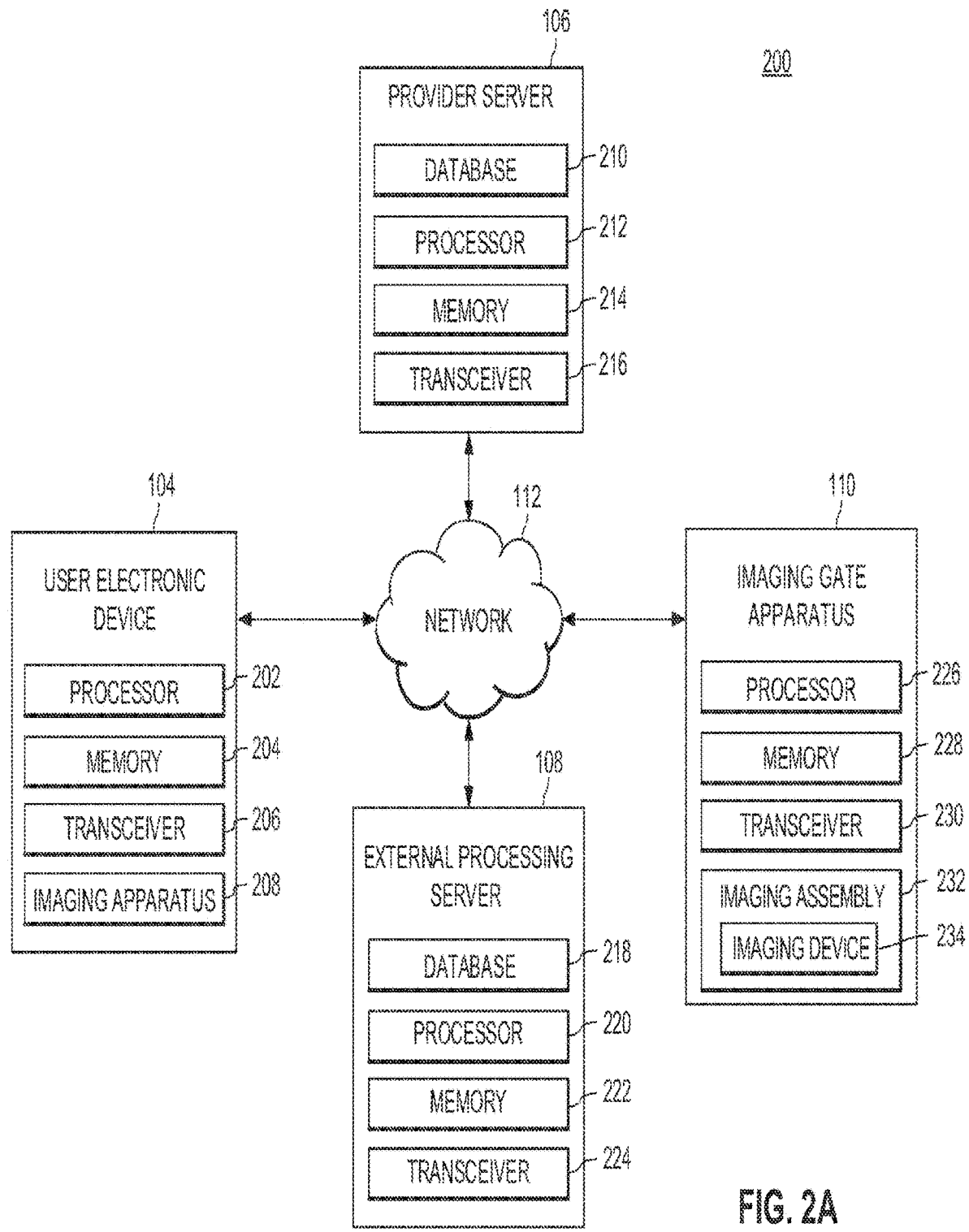
FIG. 2A illustrates another example system for analyzing vehicle image data captured by a portable imaging gate apparatus.

In reference to the example system 200 of FIG. 2A, the user electronic device 104 may include a processor 202, a memory 204, a transceiver 206, and a user interface 208. While referred to herein as a "processor" and a "memory," in some embodiments the processor 202 includes two or more processors and the memory 204 includes two or more memories. The processor 202 may be configured to process both still image data and video data (e.g., video data captured by imaging gate apparatus 110) and analyze aspects of the still image data and/or video data. The memory 204 may store computer-executable instructions, which may be executed by the processor 202. The user interface 208 may be configured to display one or both of still images and video footage (e.g., video data received from the imaging gate apparatus 110).

In various embodiments, the user electronic device 104 may execute computer-executable instructions, such as a mobile application, that allow some of the actions described herein to be implemented. For example, if the user electronic device 104 is a smartphone, the user may receive data from the imaging gate apparatus 110 via the transceiver 206 for display on the user interface 208. The user electronic device 104 may then transmit the data through the network 114 to the provider server 106 and/or the external processing server 108 for processing. The user electronic device 104, and each of the computing devices referred to herein, may be any suitable computing device such as, but not limited to, a desktop computer, a laptop computer, a mobile phone such as a smart phone, a tablet, a phablet, smart glasses, other wearable computing device(s), etc.

The provider server 106 may include a database 210, a processor 212, a memory 214, and a transceiver 216. While referred to herein as a "processor" and a "memory," in some embodiments the processor 212 includes two or more processors and the memory 214 includes two or more memories. The processor 212 may be configured to process both still image data and video data (e.g., video data captured by the imaging gate apparatus 110) and analyze aspects of the still image data and/or video data. The memory 214 may store computer-executable instructions, which may be executed by the processor 212. The database 210 may include a plurality of risk evaluations. The plurality of risk evaluations may correspond to a plurality of insured user profiles/accounts, insurance policies, or other user profiles, accounts, policies, etc.

Further, the plurality of risk evaluations may include relevant data associated with a user or item indicated in the risk evaluation. For example, if one of the plurality of risk evaluations is an insurance policy listing a first user as the insured, the insurance policy may list the first user's name, age, gender, etc. Moreover, and as discussed further herein, the relevant data may include multiple profile features associated with each risk evaluation. These profile features may for example, include vehicle features such as year, make, model, color, and/or VIN for the vehicle (e.g., vehicle 102).

The external processing server 108 may include a database 218, a processor 220, a memory 222, and a transceiver 224. While referred to herein as a "processor" and a "memory," in some embodiments the processor 220 includes two or more processors and the memory 222 includes two or more memories. The processor 220 may be configured to process both still image data and video data (e.g., video data captured by the imaging gate apparatus 110) and analyze aspects of the still image data and/or video data. The memory 222 may store computer-executable instructions, which may be executed by the processor 220.

In embodiments where, as noted above and as further discussed below, video image data is provided to an insurance provider, the insurance provider may receive this indication at the provider server 106. The provider server 106, in embodiments, may also make available for download (e.g., via the network 114) the application executed by the user electronic device 104 to implement functionality described herein. It will be appreciated that one or both of the provider server 106 or the external processing server 108 may be a server provided by or used by the insurance provider, or use of which the insurance provider otherwise controls or facilitates.

The imaging gate apparatus 110 may include a processor 226, a memory 228, a transceiver 230, and an imaging assembly 232. While referred to herein as a "processor" and a "memory," in some embodiments the processor 226 includes two or more processors and the memory 228 includes two or more memories. The processor 226 may be configured to process both still image data and video data (e.g., video data captured by the imaging gate apparatus 110) and analyze aspects of the still image data and/or video data. The memory 228 may store computer-executable instructions, which may be executed by the processor 226. Moreover, while referred to herein as an imaging assembly 232, in some embodiments the imaging assembly 232 includes two or more imaging assemblies.

The imaging assembly 232 may include an imaging device 234 (e.g., camera and/or a video camera). As such, the imaging assembly 232 may be configured to capture one or both of still images and video footage via the imaging device 234. However, it should be understood that the imaging assembly 232 is not limited to the cameras disclosed herein. Additionally, the imaging gate apparatus 110 may be configured to receive communications from the user electronic device 104, the provider server 106, and/or the external processing server 108 in response to transmitting captured data and/or before, during, or after analyzing vehicle image data captured by the portable imaging gate apparatus 110.

The imaging gate apparatus 110 may be connected to the user electronic device 104 the provider server 106, and the external processing server 108 via the network 114, such that each device (104, 106, 108, and 110) may communicate to every other device via their respective transceivers (206, 216, 224, and 230). For example, the external processing server 108 may receive profile features from the provider server 106. The external processing server 108 may store these received profile features in the database 218 and/or the memory 222. Thus, and as discussed further herein, either the provider server 106 or the external processing server 108 may be configured to process, analyze, or otherwise interpret data captured by the imaging gate apparatus 110.

In embodiments, the network 114 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The network 114 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

Figure 2B:
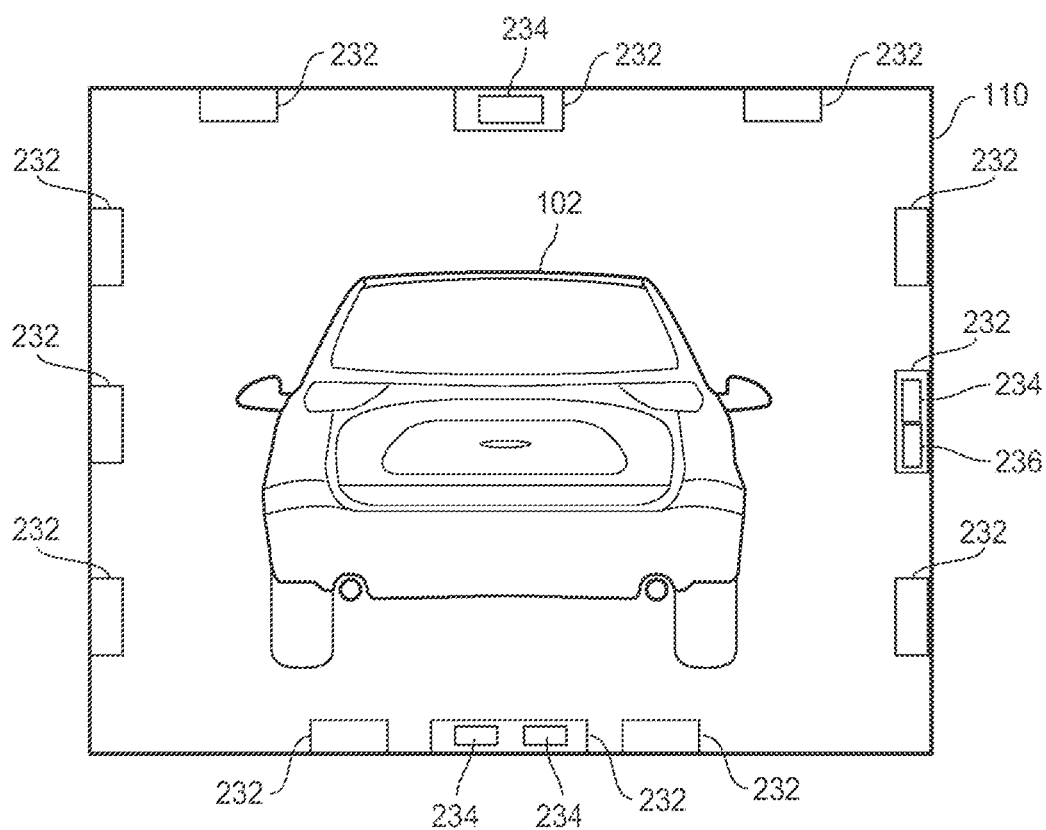
FIG. 2B illustrates an example portable gate imaging apparatus for capturing vehicle image data in accordance with, for example, the system of FIG. 2A.

FIG. 2B illustrates an example portable gate imaging apparatus 110 for capturing vehicle image data in accordance with, for example, the system of FIG. 2A. The portable imaging gate apparatus 110 includes a plurality of imaging assemblies 232. Each of the imaging assemblies 232 includes one or more imaging devices 234 (e.g., a camera, a video camera, etc.) configured to capture one or more video images of a vehicle (e.g., vehicle 102). Although illustrated here as a single imaging assembly 232 containing an imaging device 234, it is to be understood that two, all, or any number of imaging assemblies 232 may include an imaging device 234. For example, in embodiments, each imaging assembly 232 includes a visible light imaging device 234, an x-ray imaging device 234, and an infrared imaging device 234. Further, each of the imaging assemblies 232 may be positioned at a plurality of viewing angles with respect to the vehicle 102. In embodiments, the plurality of viewing angles includes one or more viewing angles featuring an undercarriage of the vehicle 102.

In embodiments, each imaging assembly 232 of the plurality of imaging assemblies 232 is adjustably connected to the portable imaging gate apparatus 110. For example, the imaging assemblies 232 located on the top frame of the portable imaging gate apparatus 110 may shift from their respective positions on the top frame to alternative positions on the top frame or any other frame of the portable imaging gate apparatus 110. The imaging assemblies 232 may be either detachably connected to the portable imaging gate apparatus 110 frame so that they may be repositioned without moving other imaging assemblies 232, or the imaging assemblies 232 may each be connected to the portable imaging gate apparatus 110 frame such that they may be shifted along the frame adjacent to the other imaging assemblies 232.

Moreover, and as discussed further herein, the portable imaging gate apparatus 110 is portable. For example, the portable imaging gate apparatus 110 is configured to be selectively placed in a first location to facilitate capturing vehicle image data. Once the vehicle image data is captured at the first location, the portable imaging gate apparatus 110 is configured to be removed from the first location and transported to a second location for capturing more vehicle image data. To facilitate such functionality, each of the plurality of imaging assemblies 232 are communicatively coupled together (e.g., via the transceiver 230) such that each respective imaging assembly 232 may communicate with each other respective imaging assembly 232. Additionally or alternatively, each of the plurality of imaging assemblies 232 may include a transceiver (e.g., transceiver 236) such that each imaging assembly 232 may individually communicate with each exterior component (e.g., user electronic device 104, provider server 106, external processing server 108).

After the vehicle image data is captured at the first location, the transceiver 230 may transmit the vehicle image data to a remote location (e.g., user electronic device 104, provider server 106, and/or external processing server 108) for further processing and/or display. Consequently, after the vehicle image data is transmitted, the portable imaging gate apparatus 110 may be transported from the first location to the second location to capture more vehicle image data.

As further described below, the example systems (100, 200) facilitate analyzing vehicle image data captured by the portable imaging gate apparatus 110, and allow, among other advantages, accessible video image data processing for vehicle analysis and a complete imaging analysis of a vehicle. Video image data is a more effective imaging technique when analyzing a vehicle exterior by facilitating viewing certain characteristics through changing light and the passage of time. Thus, vehicle image data that contains video image data is both more reliable based on the secure characteristics of the video image data and informative based on the real-time nature of the video image data. Additionally, the portable imaging gate apparatus allows user access to such video imaging capabilities at any desired location, and the undercarriage imaging assemblies incorporate previously unconsidered data such as potential fluid leakage, undercarriage mounting stability, vehicle tire alignments/brake wear, and overall vehicle undercarriage integrity into the vehicle imaging analysis.

II. Example Operational Embodiments of the Systems

FIGS. 3A-P and 4A-I depict example interfaces associated with the systems and methods. In embodiments, the interfaces may be displayed by a computing device in a user interface, such as the user electronic device 104 and the user interface 208, as discussed with respect to FIGS. 1 and 2A. Additionally, the interfaces may be accessed and reviewed by a user of an application or platform, where the user may make selections, submit entries or modifications, or facilitate other functionalities.

Figure 3A:
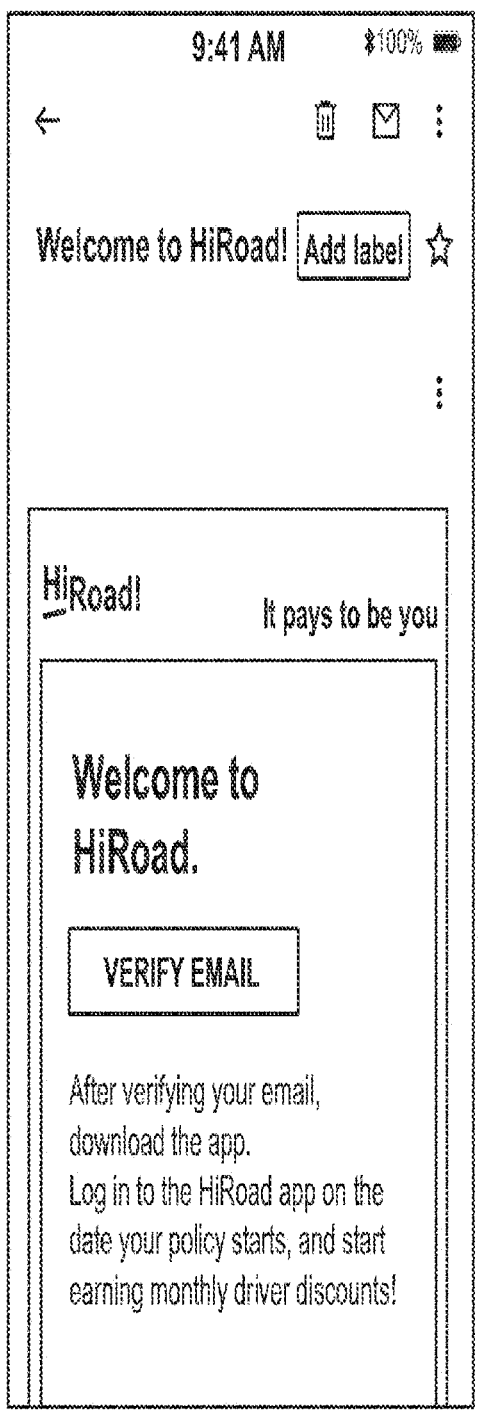
FIGS. 3A-3P depict a first set of example GUIs for an operational embodiment of, for example, the system of FIG. 2A.

FIG. 3A depicts an interface 300 associated with the systems and method described herein. In particular, the interface 300 depicts an example notification a user may receive when initially attempting to participate in a risk evaluation procedure by capturing and analyzing vehicle image data. For example, a user may initiate contact with an evaluating entity (e.g., an insurance provider, a mechanic, etc.) and said entity may provide the notification depicted in the interface 300.

Figure 3B:
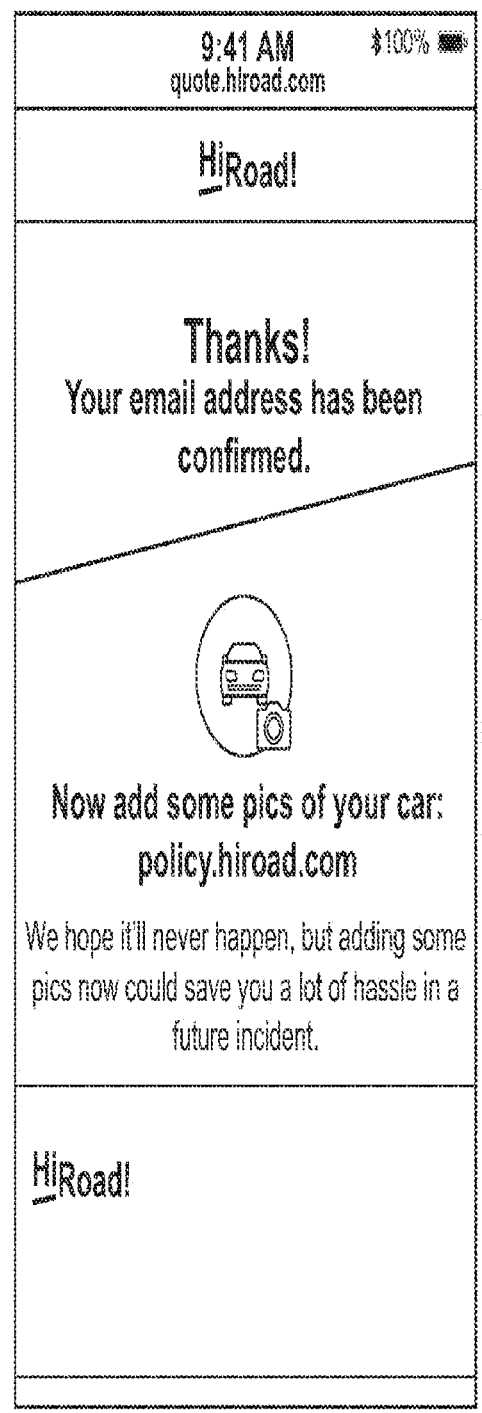

In embodiments, the evaluating entity may use the notification to verify a set of contact information associated with the user. For example the user may verify their contact information, and prompt the evaluating entity to enable the user to capture and analyze the vehicle image data. The user's verification may be transmitted from the user's device (e.g., user electronic device 104 via the user interface 208) to the evaluating entity's device (e.g., provider server 106) for further processing. Once processed, and as depicted in FIG. 3B, the evaluating entity's device may send the user a responsive notification (depicted in interface 301) confirming the user's verification. Additionally, the system (100, 200) may request that the user obtain the vehicle image data at this point, or at any other suitable time. Moreover, the user may obtain the vehicle image data at any point prior to contacting the evaluating entity, and may submit the vehicle image data to the evaluating entity afterwards.

Figure 3C:
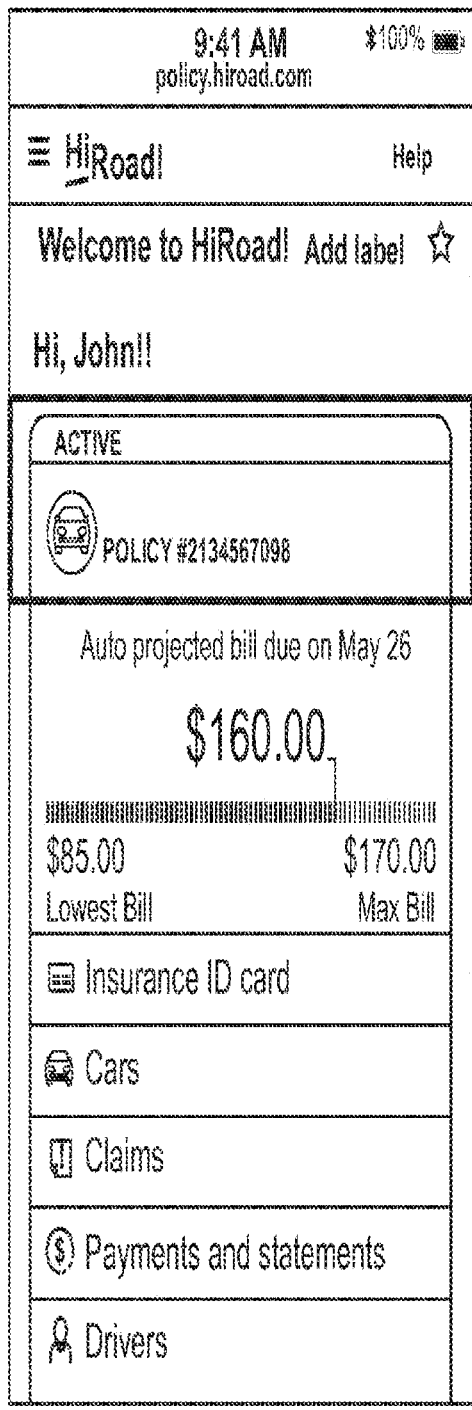

In embodiments, a user may have an established vehicle account with an evaluating entity. For example, the evaluating entity's server (e.g., provider server 106) may contain information relating to the user's vehicle in the evaluating entity's database (e.g., database 210). In this circumstance, it is possible that a user may not have obtained vehicle image data to incorporate into their vehicle account. Thus, and as illustrated in FIG. 3C, if a user logs into their vehicle account, the provider server 106 may provide an interface similar to interface 302 for the user to inspect. The interface 302 may include an identification area 303 that may include information such as policy number, account status, vehicle picture, etc. Additionally, the interface 302 may feature other relevant account information such as projected bill amounts, bill due dates, and various options for the user to select. However, if the user has not obtained vehicle image data, the identification area 303 will not include a vehicle photo.

Figure 3D:
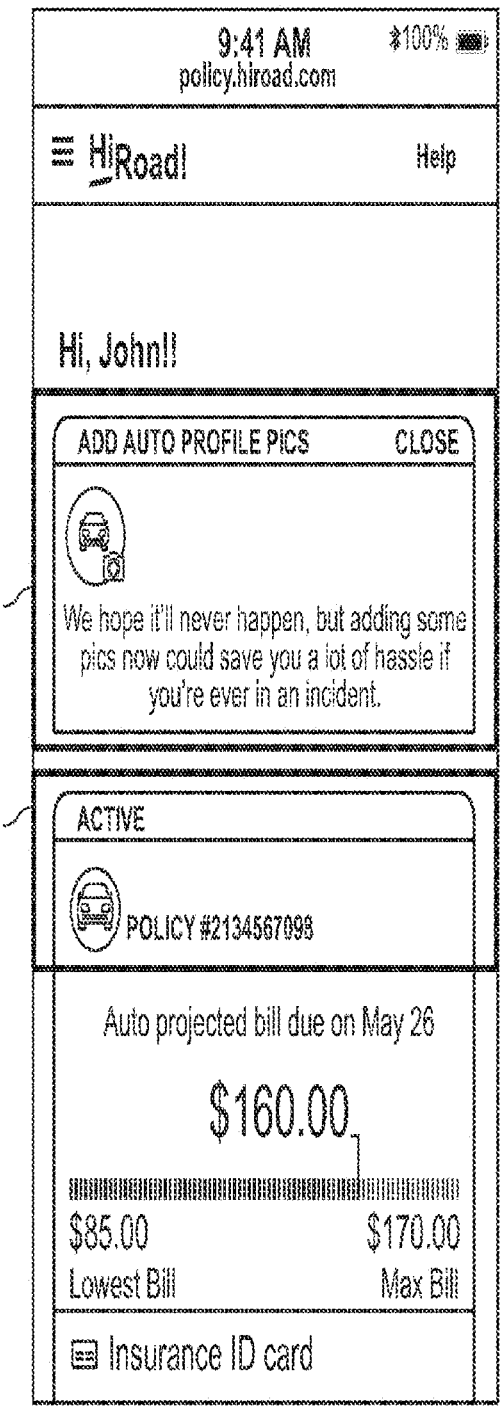

Thus, as depicted in the interface 304 of FIG. 3D, the evaluating entity's server 106 may transmit a profile picture notification 305 for display on the interface 304. The user may select the profile picture notification 305 to initiate and/or enable several of the functionalities described herein. Selecting the profile picture notification 305 may transition the user to interface 306, depicted in FIG. 3E. The interface 306 may enable a user to view all vehicles included in a particular risk evaluation procedure (e.g., an insurance policy, a mechanic service history, etc.).

For example, the interface 306 may display all car insurance policies associated with a particular user profile. The interface 306 may include an individual vehicle profile 307 for each covered vehicle. The individual vehicle profile 307 may contain information indicating the insurance policy number, the vehicle year, make, model, color, VIN, and a vehicle photo. If a user has not captured vehicle image data, the vehicle photo field of the individual vehicle profile 307 will be left empty. Thus, if a user selects the individual vehicle profile 307 depicted in FIG. 3E, the instructions executed on the processor (e.g., processor 202) may transition the application from interface 306 to interface 308, depicted in FIG. 3F.

The interface 308 includes an expanded individual vehicle profile 309 and a photo capture selection area 310. The expanded individual vehicle profile 309 may include similar information as the individual vehicle profile 307, and may include additional information associated with the vehicle and/or the corresponding vehicle policy (or, for example, a maintenance history). For example, the expanded individual vehicle profile 309 may include a policy issuance date, a policy term, a vehicle registration state, current inspection records for the vehicle, etc.

The photo capture selection area 310 may be a user-selectable option enabling certain features of the embodiments described herein. For example, a user may select the photo capture selection area 310, and the user's device (e.g., user electronic device 104) may transmit a vehicle image data capture signal to an image capture device (e.g., portable imaging gate apparatus 110). The vehicle 102 may then proceed through the image capture device 110 while the image capture device 110 captures vehicle image data of the vehicle 102. While the image capture device 110 is capturing the vehicle image data, the image capture device 110 may transmit captured vehicle image data to the user electronic device 104 for display via the user interface 208. For example, as the vehicle 102 begins to proceed through the image capture device 110, the image capture device 110 may first capture vehicle image data corresponding to the front portions of the vehicle (e.g., driver's side front, passenger's side front, driver's side front undercarriage, passenger's side front undercarriage, etc.). Thus, and as illustrated in FIGS. 3G-3I, the image capture device 110 may first transmit vehicle image data corresponding to the front portions of the vehicle 102 to the user electronic device 104.

Figure 3G:
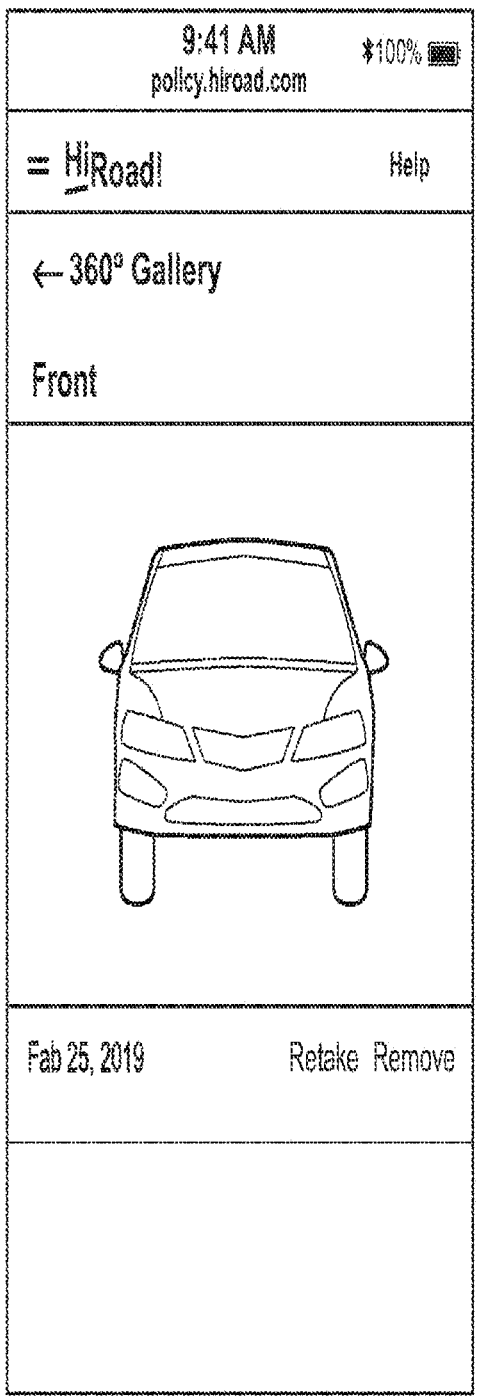
Figure 3H:
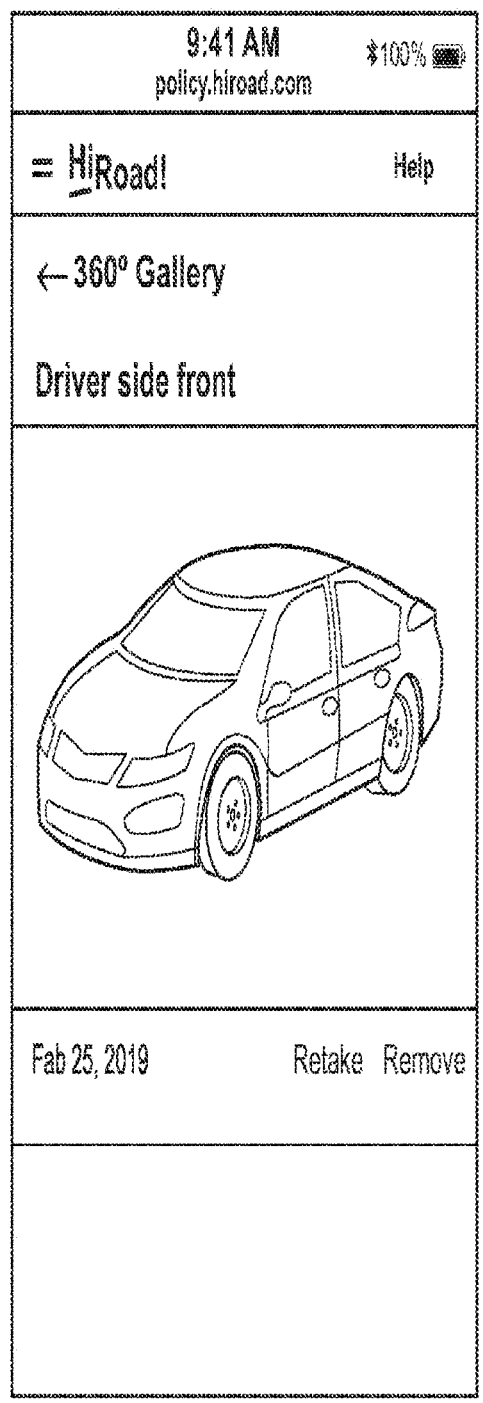
Figure 3I:
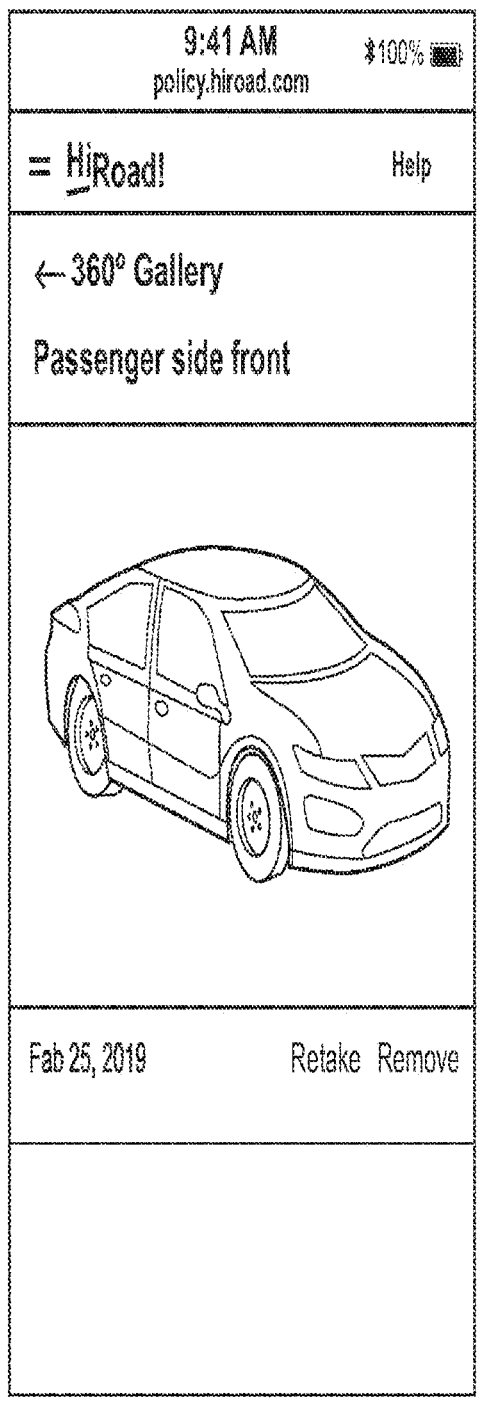
Figure 3J:
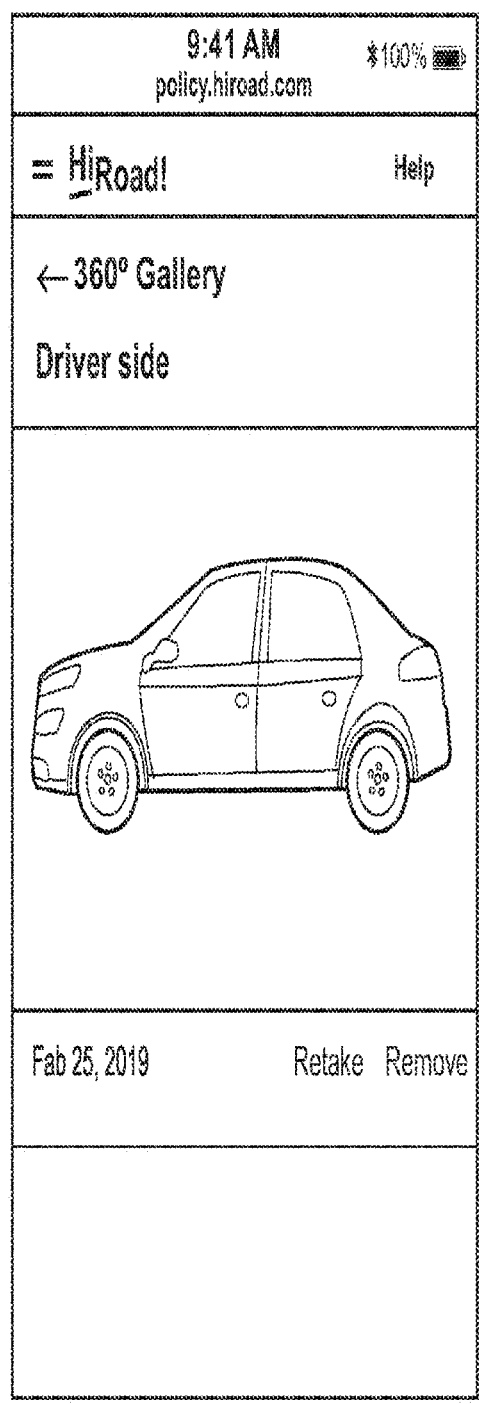
Figure 3K:
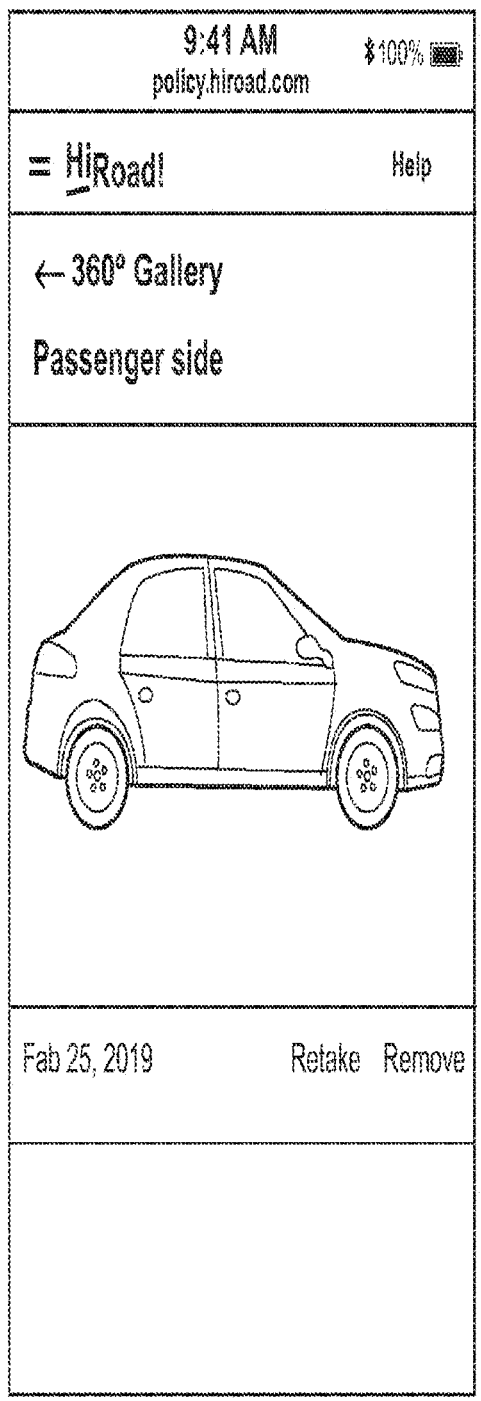
Figure 3L:
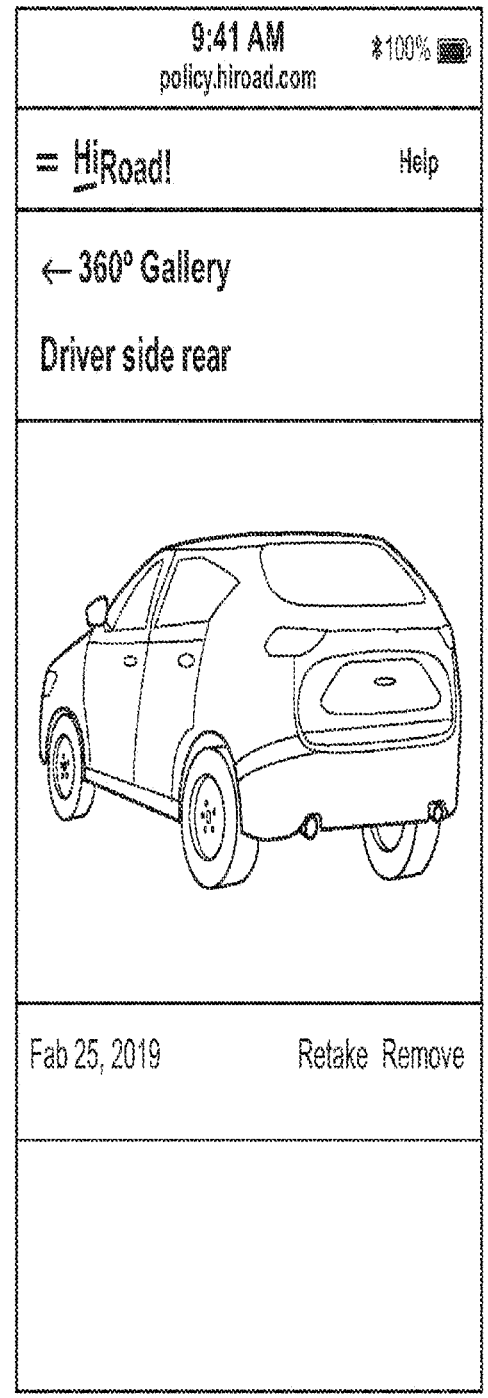
Figure 3M:
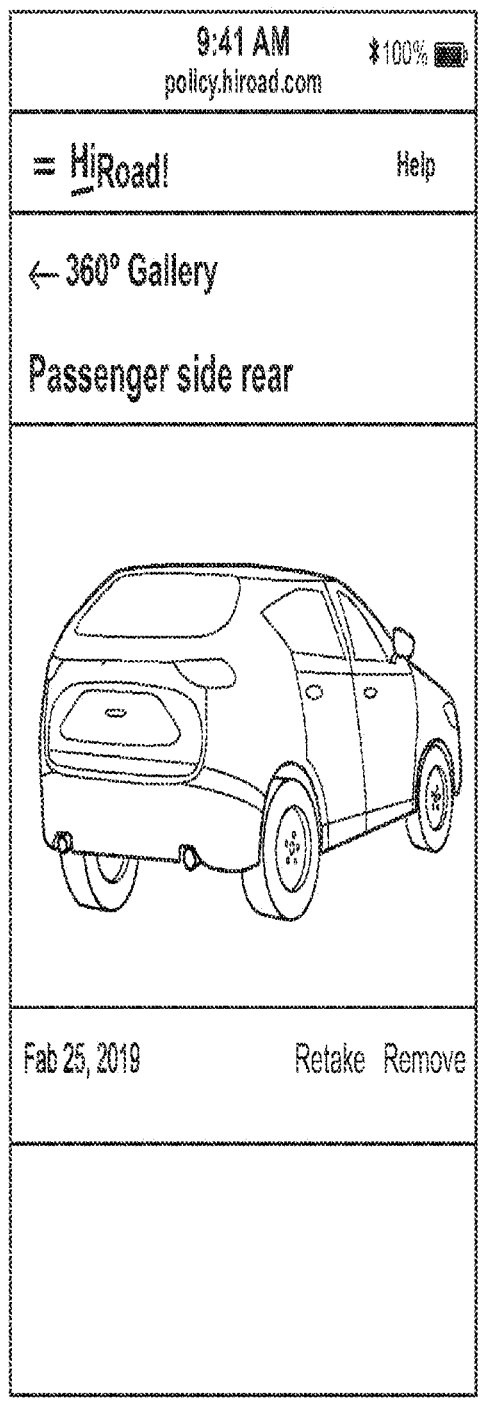
Figure 3N:
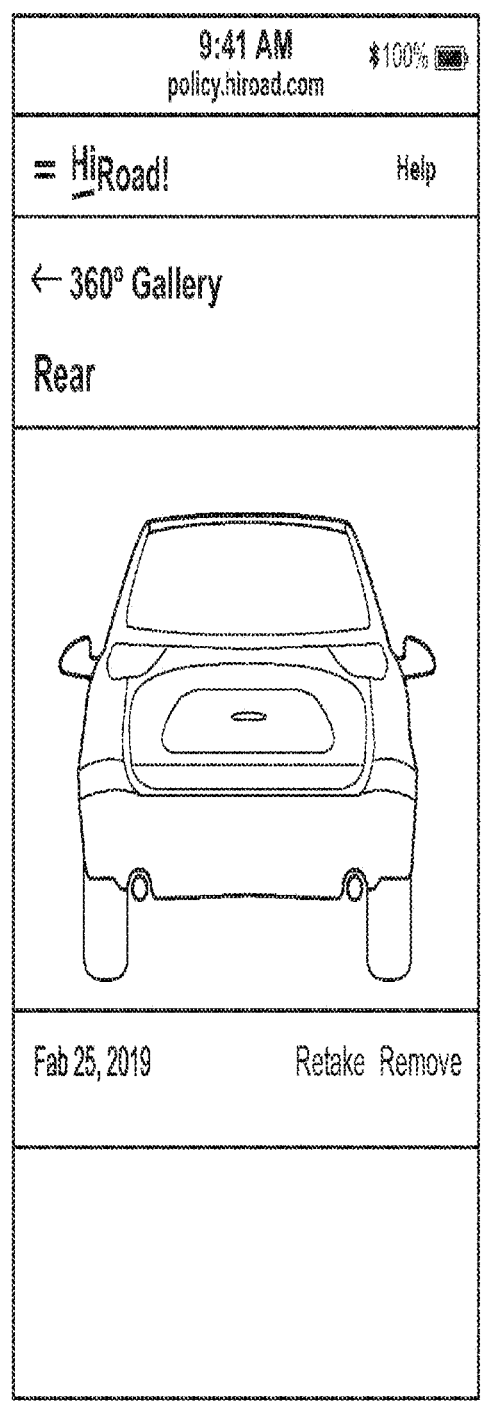

Accordingly, after beginning the vehicle data capture process, and in response to the image capture device 110 sequentially transmitting the vehicle image data, the user electronic device 104 may display interface 311, as illustrated in FIG. 3G. The interface 311 may represent a field of view (FOV) of a camera (e.g., imaging device 234). Specifically, the interface may represent a front perspective of the vehicle 102 as represented in the vehicle image data captured by the image capture device 110. As mentioned previously, to obtain a complete set of vehicle image data, the image capture device 110 may obtain images featuring various perspectives of the vehicle. Thus, as depicted in FIGS. 3G-3N, the image capture device 110 may capture vehicle image data featuring the front (interface 311), driver side front (interface 312), passenger side front (interface 313), driver side (interface 314), passenger side (interface 315), driver side rear (interface 316), passenger side rear (interface 317), and/or rear (interface 318) of the vehicle 102. It should be understood that the system (100, 200) may require capturing any combination of this vehicle image data in any order to successfully analyze the vehicle image data.

Moreover, it is to be understood that the "images" referenced and depicted in FIGS. 3G-3N may be extracted by the system (100, 200) from a single, continuous stream of video data. To illustrate, the system (100, 200) may capture the vehicle image data referenced in FIGS. 3G-3N by accessing and activating the video camera (e.g., imaging device 234) of the image capture device (e.g., portable imaging gate apparatus 110). The vehicle 102 would then proceed through the image capture device 110 while the image capture device 110 captures a continuous video of the vehicle 102 from various perspectives (e.g., as represented by interfaces 311-318).

Additionally, and as described further herein, the system (100, 200) may receive the geotagged location of the image capture device 110 to determine whether the image capture device 110 is located in a secure location. A risk evaluating entity may desire to validate/authenticate the vehicle image data captured by the image capture device 110, and determining that the image capture device 110 is located in a secure location enables the risk evaluating entity to do so. The system (100, 200) may determine that the image capture device 110 is located in a secure location by comparing the received geotagged location with a pre-determined list located in a database (e.g., database 210, database 218), comparing an entity associated with the geotagged location to a list maintained at a server (e.g., provider server 106, external processing server 108), or any other suitable method. By determining the secure location and thereby authenticating the vehicle image data, the risk evaluating entity may pay/process claims more accurately and efficiently, resulting in a higher level of overall customer service and satisfaction.

Figure 3O:
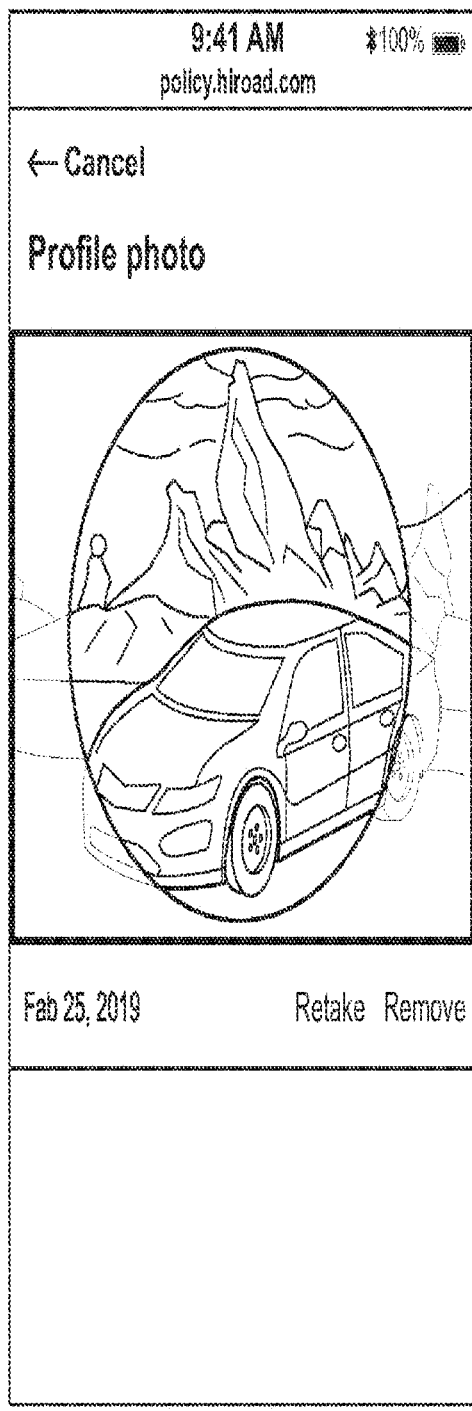
Figure 3P:
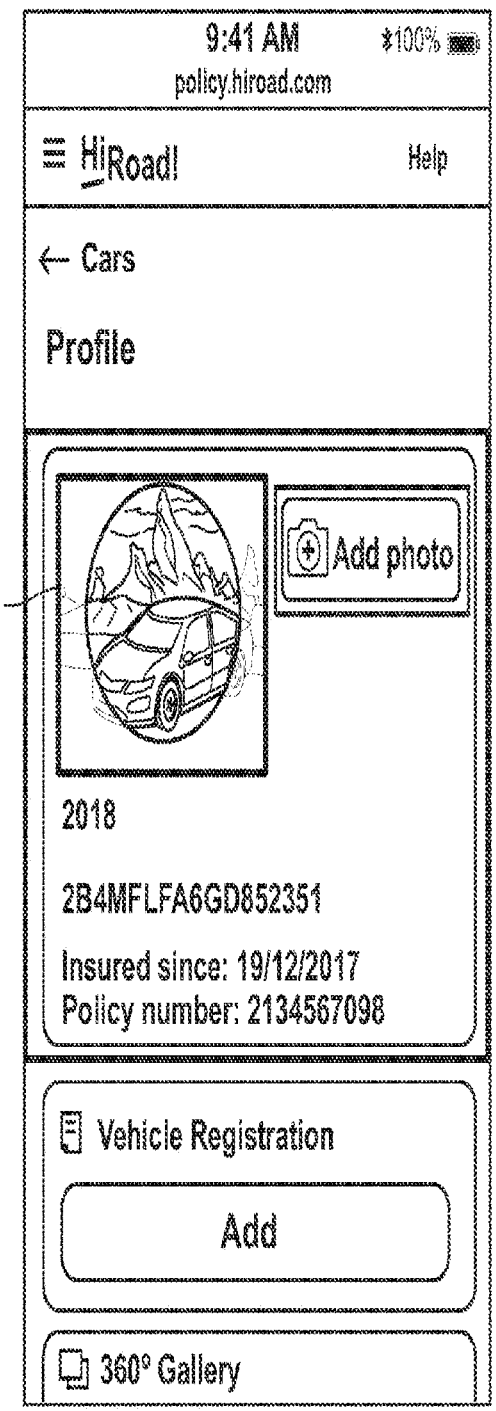

Once the system (100, 200) determines that the images acquired are sufficient, the user's device 104 may transition to interface 322, as depicted in FIG. 3O. The interface 322 may have a profile photo display area 323 and a profile photo selection area 324. The system (100, 200) may automatically determine which image of the various images captured by the image capture device 110 is placed in the profile photo display area 323 to be edited by the user, or the user may select a preferred image from the various images captured to serve as the basis for the vehicle's profile photo. The profile photo selection area 324 indicates the portion of the selected photo displayed in the profile photo display area 323 that will be displayed as the vehicle's profile photo. For example, and as depicted in FIG. 3P, the portion of the image indicated by the profile photo selection area 324 is displayed in the interface 325 under the vehicle's profile page.

Figure 4A:
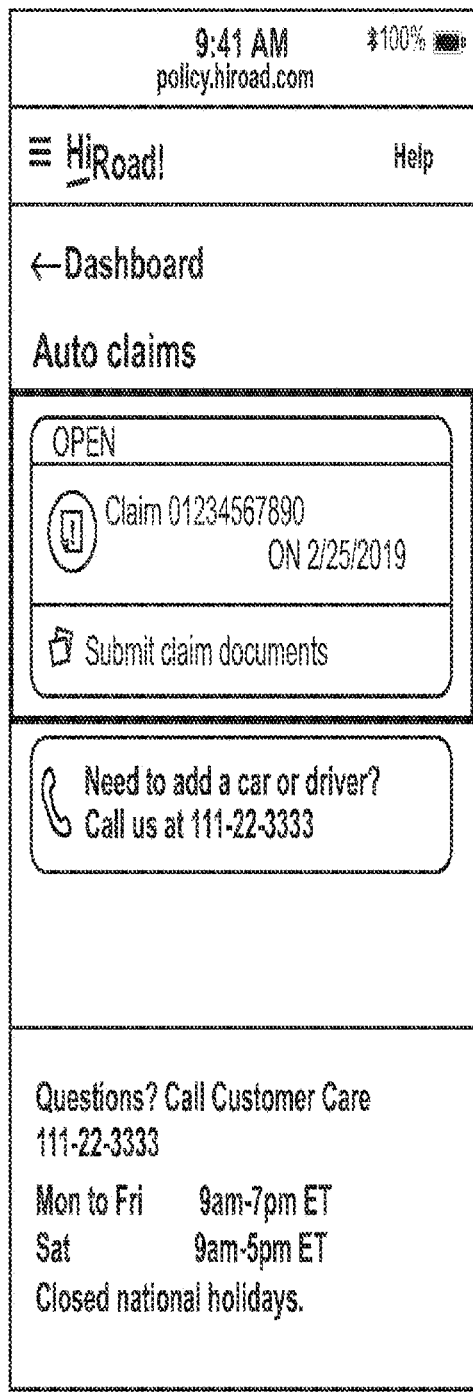
FIGS. 4A-4I depict a second set of example GUIs for an operational embodiment of, for example, the system of FIG. 2A.
Figure 4B:
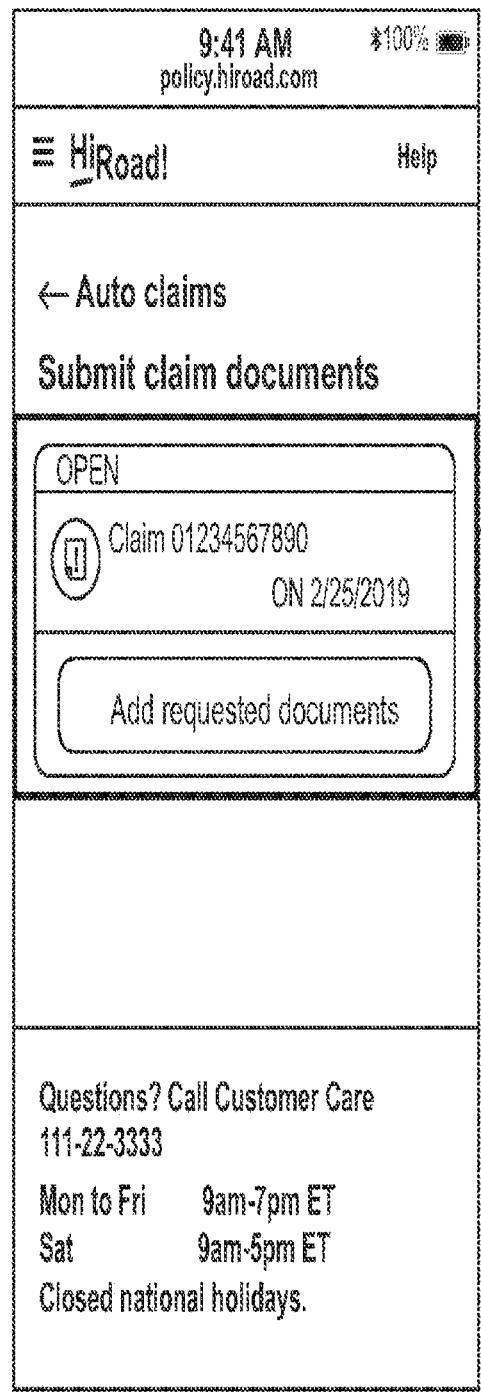

FIG. 4A depicts an interface 400 associated with the systems and method described herein. In particular, the interface 400 depicts an example active claims page an application may present to a user in response to a user's selection. The interface 400 includes an open claims area 401, which may indicate all of the user's open claims related to one vehicle or multiple vehicles. The user may interact with the open claims area 401 by selecting a particular claim, and the user's device may transition from interface 400 to the interface 402, as depicted in FIG. 4B.

Figure 4C:
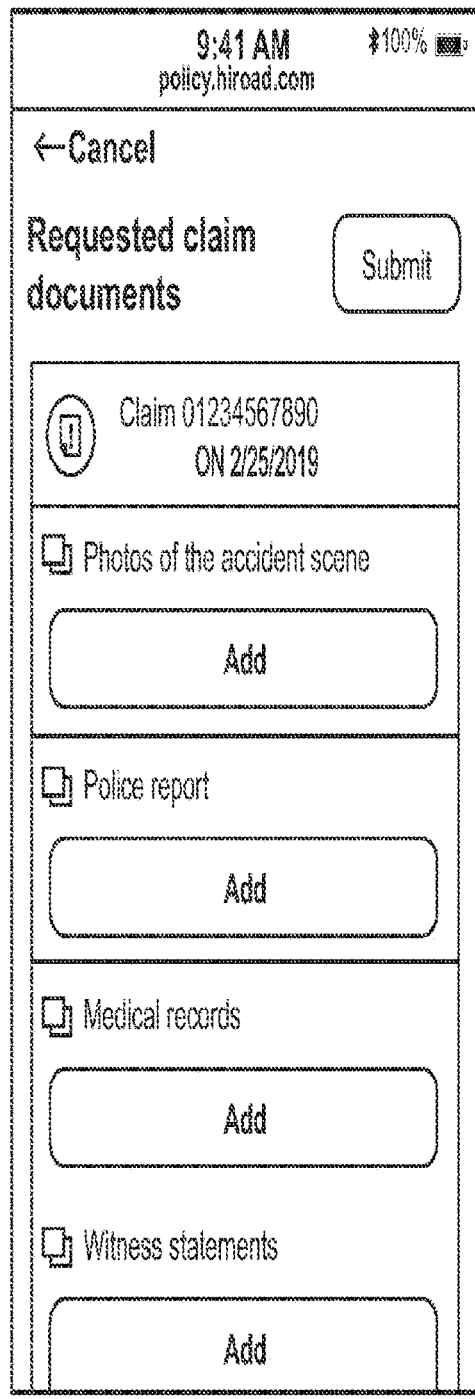

The interface 402 may include a claim documents submission area 403. The claim documents submission area 403 may indicate that a user may optionally upload documents via the application to assist in processing the claim. The user may interact with the claim documents request area 403 to prompt the application to transition from interface 402 to interface 404, as depicted in FIG. 4C.

The interface 404 includes a requested claim documents area 405. The requested claim documents area 405 may include a plurality of selectable options for a user. Each selectable option may indicate a specific type of claim information the system (100, 200) may require to adequately process a claim. For example, the requested claim documents area 405 may include selectable options for a user to enter photos of an accident scene, a police report documenting events of an event, medical records corresponding to resulting medical treatment from an event, witness statements of an event, etc. In any event, once submitted, one or both of the provider server 106 and/or the external processing server 108 will store the submitted claim documents into the database (210, 218) for potential use in the method described further herein.

Figure 4D:

Additionally or alternatively, and as depicted in FIG. 4D, the application may present the interface 406 featuring a claim documents request area 407 to a user when the system (100, 200) receives an update to a user's claim. For example, when the user first submits a claim, the system (100, 200) may recognize that no claim documents are currently accessible in the claims database (e.g., database 210, 218), or simply that no current/updated claim forms are listed in the database (210, 218) for the recently opened claim. In response, one or both of the provider server 106 and/or the external processing server 108 may via the network 114, transmit a notification to the user electronic device 104 to display the claim documents request area 407. In response to a user interacting with the claim documents request area 407, the application may transition to an interface similar to, for example, interface 404 to facilitate the user submitting relevant claim documents.

Figure 4E:
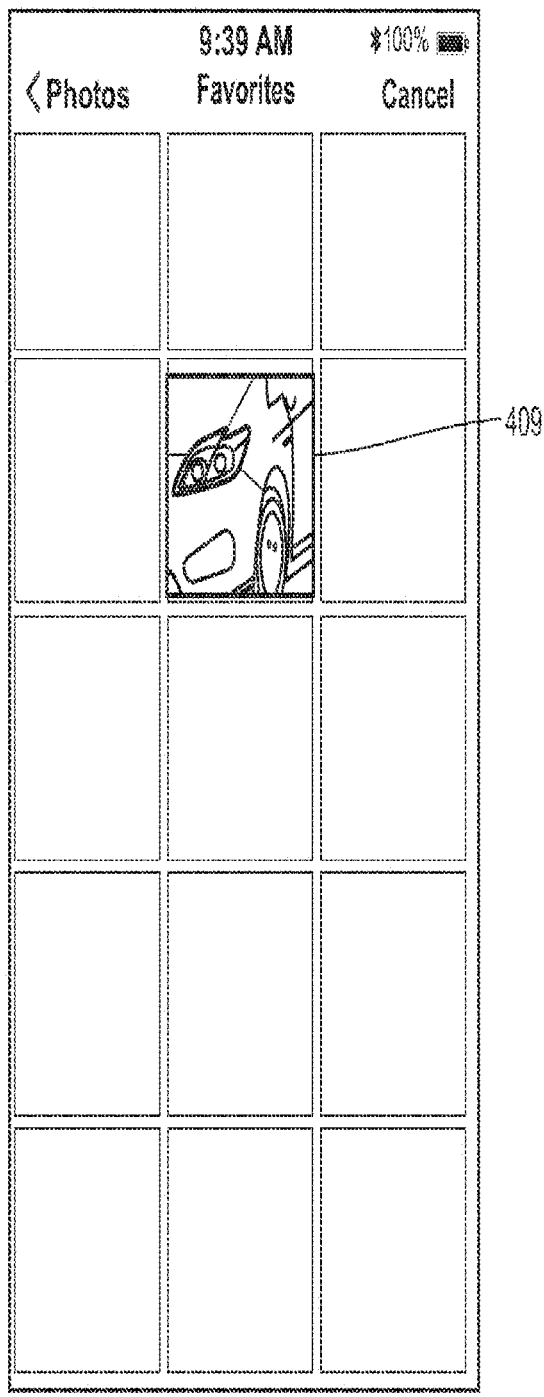

As an example of submitting claim documents, if a user selects an option to provide images of the claim event, the application may transition to interface 408, as depicted in FIG. 4E. Interface 408 includes an image gallery featuring a vehicle image 409, as captured by the image capture device 110. As further discussed herein, the vehicle image 409 may indicate potential damage to the vehicle. To complete submission, the user may interact with the vehicle image 409 via the user interface 208 to select the vehicle image 409.

Figure 4F:
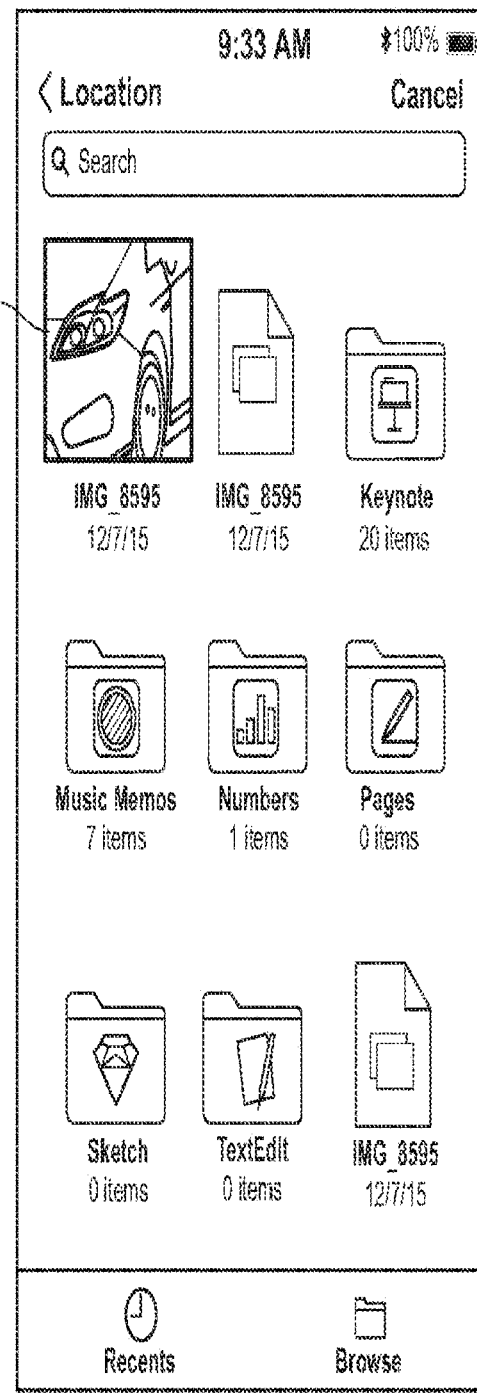

Additionally or alternatively, the application may transition to interface 411, as depicted in FIG. 4F. Interface 411 includes a file gallery featuring a set of vehicle claim images 412, as captured by the image capture device 110. Similar to interface 408, the user may select images from interface 411 and the system (100, 200) may use images selected from interface 411, and specifically from the vehicle claim images 412 to facilitate processing a claim, in accordance with various embodiments described herein.

Figure 4G:
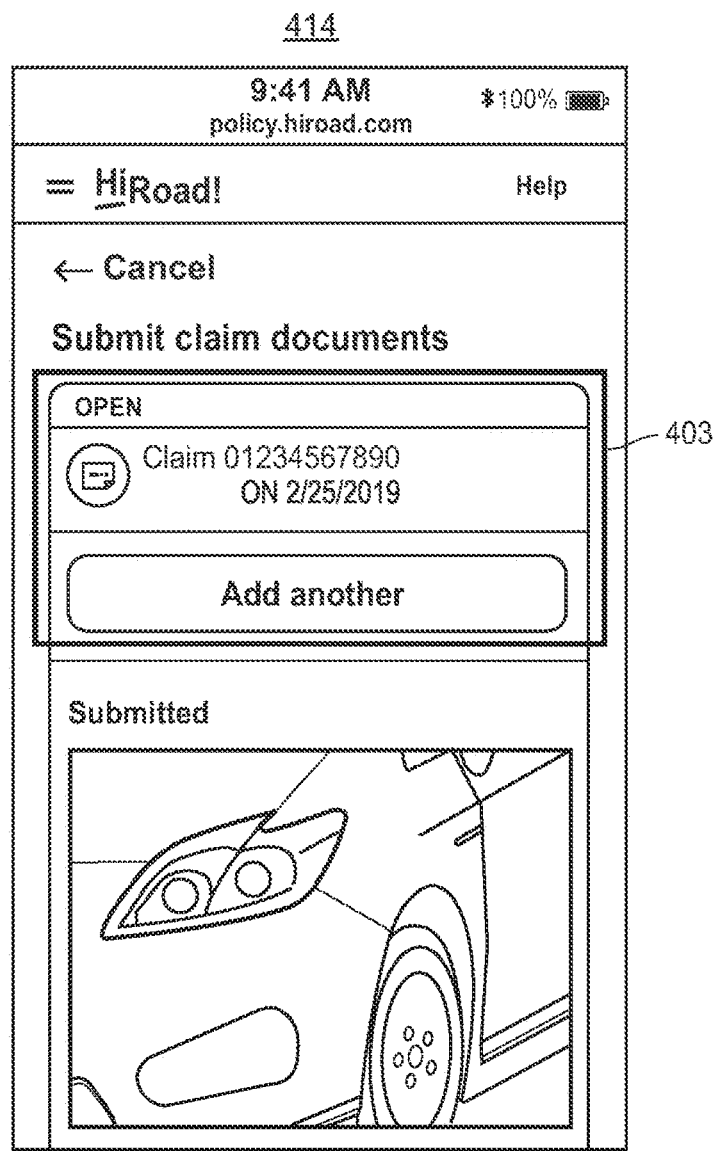
Figure 4H:
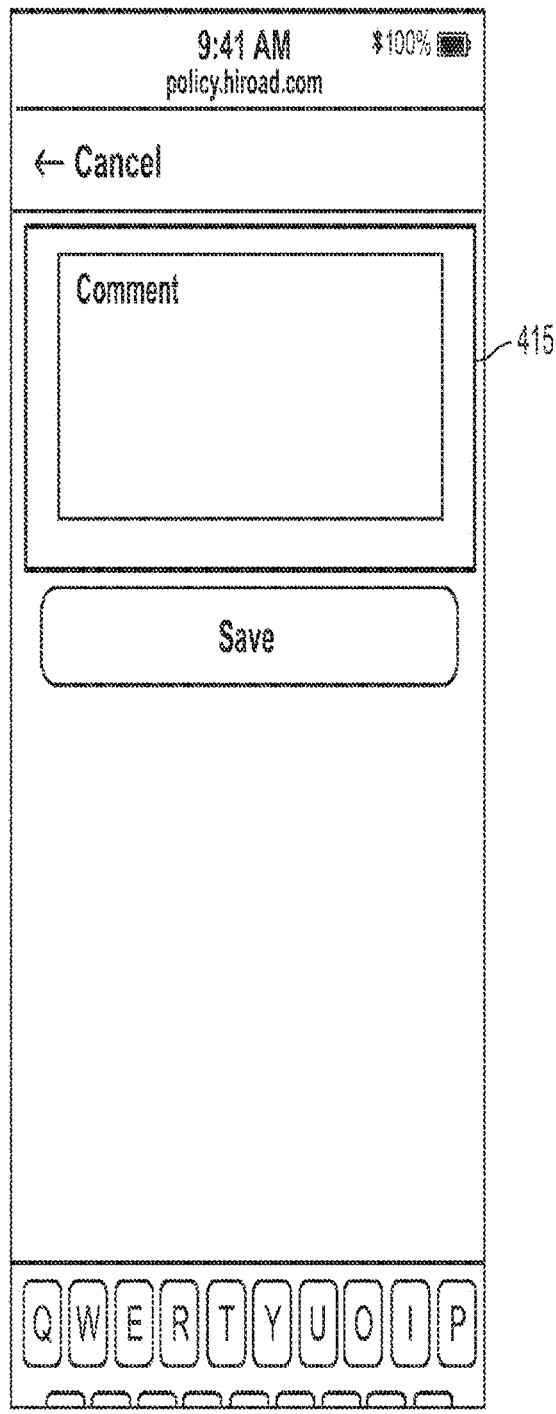

Once selected and/or captured, the images may be displayed in the interface 413, as depicted in FIG. 4G. The interface 413 includes the claim documents request area 403 from interface 402, and additionally features the selected and/or captured image(s) described with reference to FIGS. 4E and 4F. Moreover, prior to submission, the application may offer the user an opportunity to caption, comment, or otherwise label the submitted claim documents, as shown in interface 414 of FIG. 4H. The interface 414 includes a comment area 415 a user may use to describe the uploaded claim document.

For example, and as described further herein, the system (100, 200) may use the information the user submits in the comment area 415 to process a claim. More specifically, the system (100, 200) may use the information submitted in the comment area 415 to validate a submitted claim document by, for example, requesting a signature corresponding to a known user. In embodiments, the comment area 415 may serve as a password entry area. To illustrate, the system (100, 200) may authenticate claim submissions through authentication credentials in the form of a registered password associated with an account/user. Thus, once a user enters a claim document to facilitate the system (100, 200) processing a claim, the system (100, 200) may prompt a user to enter the password associated with the account to authenticate the attempted claim document entry. This authentication will facilitate an evaluating entity (e.g., insurance company, mechanic, medical underwriter) verifying and/or paying claims more accurately and efficiently, resulting in a higher level of overall customer service and satisfaction. This increased efficiency and accuracy can yield further benefits to customers in the form of risk evaluation benefits/incentives (e.g., lower insurance rates, premiums, deductibles, overall cost, etc.), which further increases customer satisfaction.

Figure 4I:
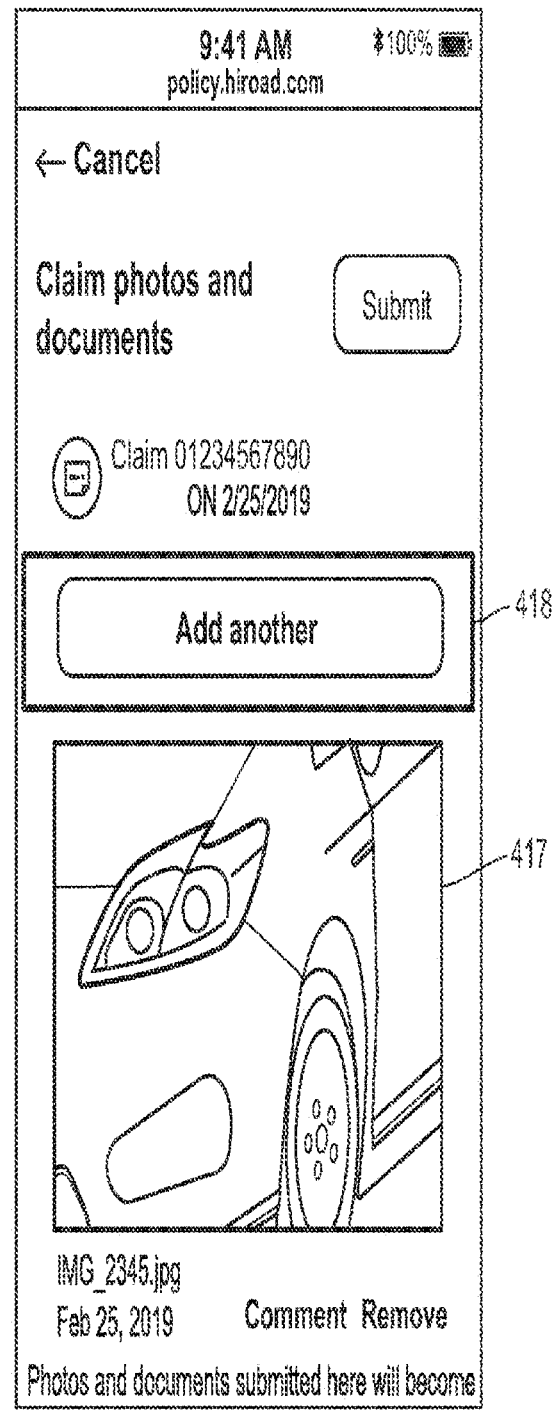

After the system (100, 200) receives a claim document, the application may transition from interface 414 to interface 416, as depicted in FIG. 4I. The interface 416 includes a submitted claim document area 417, and an additional claim document area 418. The submitted claim document area 417 may feature all validly submitted claim documents for a given claim. The submitted claim document area 417 may also include selectable options corresponding to each validly submitted claim document, such as options to comment (e.g., comment area 415) and/or remove the validly submitted claim document from the claim such that the system (100, 200) will not consider the document when processing the claim. The additional claim document area 418 may include a selectable option for a user to upload additional claim documents related to the claim event.

It should be understood that the functional embodiments of the system (100, 200) described herein may be applicable to capturing vehicle image data via an image capture device 110. Further, it should be understood that the "images" or "photos" described in reference to the functional embodiments of the system (100, 200) may be real-time streaming, or pre-recorded video image data to facilitate capturing vehicle image data before and/or after a claim event.

Figure 5:
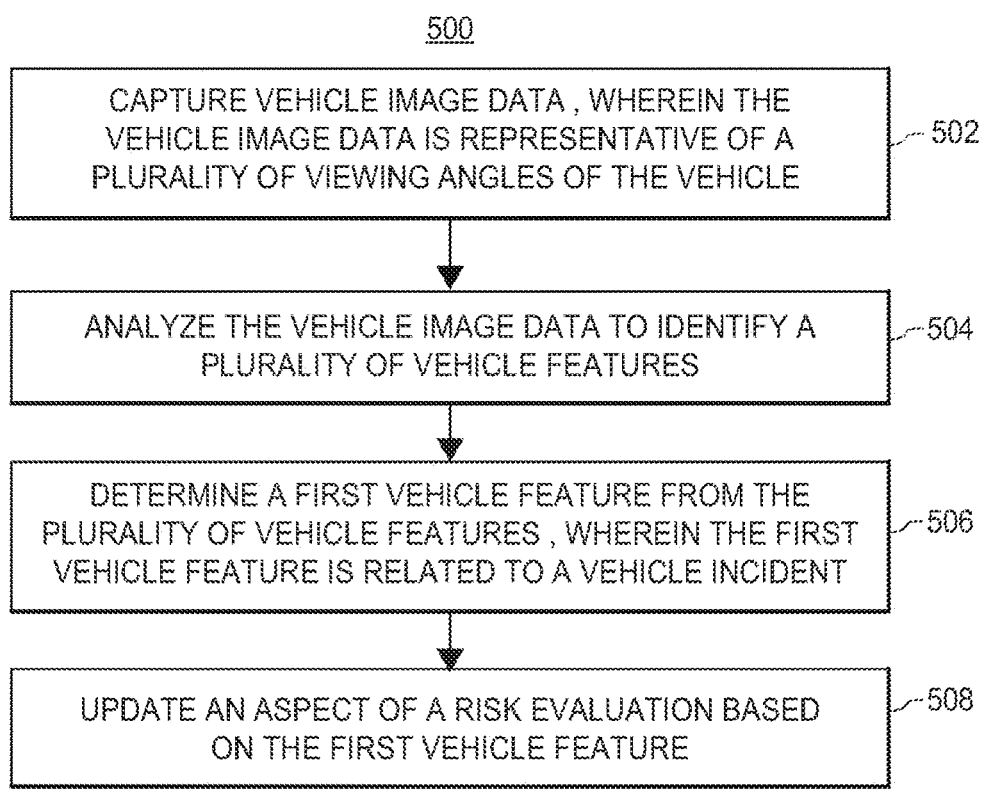
FIG. 5 is a flowchart depicting an example method corresponding to various embodiments of the present disclosure.

III. Example of a Method for Analyzing Vehicle Image Data Captured by a Portable Imaging Gate Apparatus FIG. 5 is a flowchart depicting an example method 500 corresponding to various embodiments of the present disclosure. The method 500 begins at block 502 where a portable imaging gate apparatus (e.g., portable imaging gate apparatus 110) captures vehicle image data. The vehicle image data is representative of a plurality of viewing angles of a vehicle (e.g., vehicle 102). For example, the portable imaging gate apparatus 110 may be transported to a location where the transceiver 230 and imaging apparatuses 232 may connect to a network (e.g., network 114) suitable for facilitating certain steps of the methods discussed herein.

In embodiments, the plurality of viewing angles includes one or more viewing angles featuring an undercarriage of the vehicle 102. For example, in embodiments, and as illustrated in FIG. 2B, the portable imaging gate apparatus 110 may include a plurality of imaging assemblies 232, each including one or more imaging devices 234. One or more of the imaging assemblies 232 may be positioned on a bottom frame of the portable imaging gate apparatus 110 such that those imaging assemblies 232 may be configured to capture one or more images of the vehicle 102 featuring the undercarriage of the vehicle 102.

From the undercarriage perspective, the imaging assemblies 232 may capture vehicle image data indicative of a variety of issues. For example, vehicle image data featuring the undercarriage of a vehicle 102 may indicate leaks and/or faults in a variety of interior vehicle systems (e.g., transmission, differential, oil filtration, radiator, engine, etc.). Moreover, the vehicle image data from imaging assemblies 232 with an undercarriage perspective is optimal to detect the presence of issues corresponding to tire/brake alignment and/or wear.

Moreover, in embodiments and as illustrated in FIG. 2B, each of the plurality of imaging assemblies 232 may be configured to capture respective vehicle image data from a respective viewing angle. For example, each of the plurality of imaging assemblies 232 may be positioned at different locations on the portable imaging gate apparatus 110. From these different locations on the portable imaging gate apparatus 110, each of the imaging assemblies 232 may have a different viewing angle with respect to the vehicle 102. Thus, when the vehicle 102 passes through the portable imaging gate apparatus 110, the vehicle image data captured by each of the imaging assemblies 232 will feature the vehicle 102 at various respective angles/perspectives. To illustrate, an imaging assembly 232 positioned at a point on the top frame of the portable imaging gate apparatus 110 will capture respective vehicle image data of the vehicle 102 from an overhead perspective, while an imaging apparatus 232 positioned on the bottom frame of the portable imaging gate apparatus 110 will capture respective vehicle image data of the vehicle 102 from an undercarriage perspective.

Capturing vehicle image data from a plurality of viewing perspectives/angles allows the portable imaging gate apparatus 110 to better capture the vehicle image data. For example, the portable imaging gate apparatus 110 can effectively capture vehicle image data corresponding to all points on the exterior and undercarriage of the vehicle 102, leading to a complete assessment of the vehicle's 102 exterior condition. Additionally, and as discussed further herein, capturing vehicle image data indicative of the undercarriage of the vehicle 102 may allow the portable imaging gate apparatus 110 to additionally assess certain interior conditions of the vehicle 102. Moreover, in embodiments featuring two or more imaging apparatuses 232 on a particular frame of the portable imaging gate apparatus 110, the portable imaging gate apparatus 110 may self-validate any indications of scratches, dings, impacts, faults, leaks, or other damage to the exterior and/or interior of the vehicle 102 by checking the vehicle image data acquired by multiple imaging assemblies 232. For example, if a particular scratch on the surface of the vehicle 102 appears in the vehicle image data captured by two or more imaging apparatuses, then it is likely that the scratch not only exists, but should be identified in future processing of the vehicle image data. Thus, the portable imaging gate apparatus 110 may both identify and validate any detected damage through the use of multiple imaging apparatuses 232.

In embodiments, each imaging apparatus 232 is adjustably connected to the portable imaging gate apparatus 110. For example, each vehicle 102 that passes through the portable imaging gate apparatus 110 may be a different year, make, model, etc., and thus may be different sizes (e.g., sedan, sport-utility vehicle (SUV), bus, motorcycle). Accordingly, the viewing angles used for one vehicle 102 may not be suited to accomplish capturing vehicle image data for another vehicle 102. To accommodate various vehicle types, the imaging apparatuses 232 may be adjustably connected to the portable imaging gate apparatus 110 such that the position of each imaging apparatus 232 may be adjusted to better capture the vehicle image data for any given vehicle 102.

To illustrate, assume the portable imaging gate apparatus 110 is configured to capture vehicle image data for a small sedan. Each of the imaging apparatuses 232 on a particular frame of the portable imaging gate apparatus 110 may be closely positioned adjacent to the other imaging apparatuses 232 on the particular frame because the small sedan does not occupy a large field of view (FOV) for any one imaging apparatus 232. However, once the portable imaging gate apparatus 110 has captured the vehicle image data for the small sedan, assume a bus becomes the next vehicle 102 to be imaged. To accommodate the relatively large proportions of the bus, each of the imaging apparatuses 232 on a particular frame may be spaced further away from the other imaging apparatuses 232 on the particular frame. Thus, the portable imaging apparatus 110 will be able to capture the vehicle image data for the bus because the collective FOV of the imaging apparatuses 232 on each frame will enable the portable imaging apparatus 110 to view the full extent of each angle of the bus.

In embodiments, each of the imaging apparatuses 232 may be detachably connected to the portable imaging gate apparatus 110. For example, assume the portable imaging gate apparatus 110 includes 12 total imaging apparatuses 232, with 3 imaging apparatuses 232 on each frame (e.g., top frame, bottom frame, and 2 side frames). Should a particular vehicle 102 passing through the portable imaging gate apparatus 110 be small enough to only require 1 imaging apparatus 232 on each frame (e.g., the FOV of a single imaging apparatus 232 is sufficient to capture the entire surface area of a vehicle 102 from a particular viewing angle), then the user may detach 2 imaging apparatuses 232 from each frame, leaving only 1 imaging apparatus 232 on each frame.

In embodiments, the portable imaging gate apparatus 110 is extendable, and thus can expand or contract to accommodate vehicles 102 of varying sizes. Moreover, each frame of the portable imaging gate apparatus 110 may independently expand or contract. To illustrate, referencing the sedan and bus example, the portable imaging gate apparatus 110 may need to extend vertically prior to capturing vehicle image data corresponding to the bus because the bus is relatively taller than the sedan. Accordingly, a user may extend the portable imaging gate apparatus' 110 vertical side frames to accommodate the taller profile of the bus with respect to the previously imaged sedan. Further, should the imaging apparatuses 232 positioned on the portable imaging gate apparatus' 110 vertical side frames be insufficient to capture the vehicle image data indicative of the bus, additional imaging apparatuses 232 may be attached to the portable imaging gate apparatus' 110 vertical side frames to supplement the composite FOV.

In embodiments, the portable imaging gate apparatus 110 may automatically extend and/or contract the lengths of its respective frames in response to determining the proportions of a vehicle 102 to be imaged. To illustrate, again referencing the sedan and bus example, the portable imaging gate apparatus 110 may detect the presence of the bus through one of the plurality of imaging apparatuses 232. The portable imaging gate apparatus 110 may also determine that the bus is taller than the sedan because the images captured by the one of the plurality of imaging apparatuses 232 does not include a complete view of the bus from the one of the plurality of imaging apparatuses' 232 perspective. Thus, the portable imaging gate apparatus 110 may determine a height adjustment to the portable imaging gate apparatus 110 is required to accommodate the bus. The portable imaging gate apparatus 110 may then determine the necessary length adjustment for respective frames, transmit signals to actuators (not shown) configured to adjust the respective frames of the portable imaging gate apparatus 110, and thus cause the actuators to adjust the respective frames of the portable imaging gate apparatus 110 according to the necessary length adjustment. It will be appreciated that the necessary length adjustment may correspond to adjustments of both the height and width of the portable imaging gate apparatus 110.

In embodiments, the portable imaging gate apparatus 110 may be collapsible to facilitate the capture of vehicle image data at various locations. For example, each or some of the frames of the portable imaging gate apparatus 110 may be collapsible such that the frames may expand/contract and/or fold or otherwise meet to form a portable imaging gate apparatus 110 of reduced size with respect to the configuration for capturing vehicle image data. In this way, the portable imaging gate apparatus 110 may readily transported to various locations to facilitate vehicle image data capture, and thus reduce the burden on vehicle 102 owners/drivers to travel great distances to facilitate vehicle image data analysis (e.g., a vehicle inspection).

In embodiments, each imaging apparatus 232 may be configured to capture the respective vehicle image data using one or more of (i) visible light imaging, (ii) infrared imaging, or (iii) x-ray imaging. For example, each imaging apparatus 232 may include an imaging device 234 configured to capture the vehicle image data using visible light imaging, another imaging device 234 configured to capture the vehicle image data using infrared imaging, and another imaging device 234 configured to capture the vehicle image data using x-ray imaging. To illustrate, and due to the heat intensive processes associated with the vehicle 102 undercarriage, vehicle image data indicative of the vehicle's 102 undercarriage may be more informative using infrared imaging techniques. Similarly, due to varying material densities used throughout a vehicle 102, vehicle image data captured using x-ray imaging may yield information not otherwise available with either visible light imaging or infrared imaging techniques. It should be understood that each imaging apparatus 232 may include an imaging device 234 configured to capture the vehicle image data using other suitable wavelengths and/or imaging techniques.

In embodiments, the portable imaging gate apparatus 110 is configured to be detachably affixed to one or more surfaces. For example, the portable imaging gate apparatus 110 may have attachment points on one, some, or all of the portable imaging gate apparatus' 110 frames. The attachment points may include areas where attachment devices (e.g., hooks, screws, nails, adhesives, buttons, etc.) may be affixed to facilitate the portable imaging gate apparatus' 110 attachment to any surface.

To illustrate, the portable imaging gate apparatus 110 may include mounting brackets on the attachment points of one of the portable imaging gate apparatus' 110 side frames. Using these mounting brackets, the portable imaging gate apparatus 110 may be detachably affixed to the side of a building, such that the bottom frame contacts the ground. Moreover, the mounting brackets may be affixed to the attachment points via hinged joints, such that the portable imaging gate apparatus 110 may fold flat against the side of the building, for example, when not in use.

In another illustration, the top frame may include sliding anchors on the attachment points. Using these sliding anchors, the portable imaging gate apparatus 110 may be detachably affixed to the ceiling, overhang, etc. of a building, such that the bottom frame contacts the ground. Moreover, the sliding anchors may allow the portable imaging gate apparatus 110 to slide along the attachment points or the building surface to adjust the entry point for vehicles 102.

The method 500 continues at block 504 by analyzing the vehicle image data to identify a plurality of vehicle features. The plurality of vehicle features may reference the identification information discussed with reference to FIGS. 3A-3P and 4A-4I (e.g., year, make, model, color, and/or VIN of vehicle 102, etc.). For example, the external processing server 108 may analyze the video data by video analysis techniques including object recognition (OR), object character recognition (OCR), and other suitable methods. Block 504 may be performed by, for example, the external processing server 108.

The method 500 continues at block 506 by determining a first vehicle feature from the plurality of vehicle features. The first vehicle feature is related to a vehicle incident. To illustrate, the vehicle incident may be contact between the vehicle 102 and a stationary object (e.g., street sign, fire hydrant, parked car, etc.) which causes damage to the vehicle 102 exterior. One, some, or all of the vehicle 102 images (e.g., vehicle image data) may include an indication of the damage associated with the contact, which may then be designated as the first vehicle feature. For example, the first profile feature may be indicated in one, some, or all of the vehicle 102 images taken from each of the various perspectives discussed with reference to FIGS. 3G-3N (e.g., front, driver side, driver side front, driver side rear, passenger side front, passenger side, passenger side rear, rear, etc.). Each vehicle 102 image containing an indication of the damage associated with the vehicle incident may be included, or the external processing server 108 may select one image that best depicts the vehicle incident damage. Block 512 may be performed by, for example, the external processing server 108.

The method 500 continues at block 508 by updating an aspect of a risk evaluation based on the first vehicle feature (e.g., to facilitate claim processing, medical evaluations/underwriting, mechanic assessments, etc.). In embodiments, an insurance policy is generated based upon the risk evaluation. Moreover, in response to the insurance policy generation, updating the aspect of the risk evaluation includes updating one or more of (i) a cost associated with the insurance policy, (ii) a premium associated with the insurance policy, (iii) a deductible associated with the insurance policy, (iv) a discount associated with the insurance policy, or (v) a coverage level associated with the insurance policy. Block 508 may be performed by, for example, the provider server 106.

For example, the provider server 106 may analyze the first vehicle feature to determine an update for a risk evaluation. Optionally, the provider server 106 may generate an insurance policy in response to the first vehicle feature if the provider server 106 determines that the first vehicle feature satisfies underwriting criteria for a particular insurance provider. To illustrate, the provider server 106 may analyze the first vehicle feature to determine that no damage exists on the vehicle 102 exterior/undercarriage. In response, the provider server 106 may determine that the vehicle 102 satisfies underwriting criteria for an insurance provider (e.g., to facilitate insurance acquisition such as insurance deductible estimation, insurance premium estimation, insurance benefits/incentives determinations, etc.), and thus qualifies for insurance coverage.

Additionally or alternatively, the provider server 106 may analyze the first vehicle feature to determine an update for a risk evaluation where an insurance policy already exists for the vehicle 102. In this circumstance, the first vehicle feature 106 may indicate a continuing lack of damage on the exterior/undercarriage of the vehicle 102. Thus, the provider server 106 may update an aspect of the risk evaluation by, for example, lowering the premium on the vehicle's 102 associated insurance policy. In this way, the provider server 106 may incentivize careful/quality driving by rewarding first vehicle features indicating a lack of damage with consumer-friendly cost reductions corresponding to the vehicle's 102 associated insurance policy.

By providing a systems and methods that allow analyzing vehicle image data captured by a portable imaging gate apparatus 110 as described herein, various advantages are achieved. For example, the systems and methods provide and/or are implemented through the use of a device(s) that provide information particularly suited for use with other features of the systems and methods to analyze vehicle image data captured by a portable imaging gate apparatus 110. Notably, the systems and methods provide a seamless solution to capturing and analyzing vehicle image data by capturing and analyzing all necessary data through a single video image data capture via a portable imaging gate apparatus 110. Moreover, the systems and methods capture the vehicle image data from a plurality of viewing angles, including a viewing angle featuring the vehicle's 102 undercarriage. By capturing vehicle image data corresponding to the vehicle's 102 undercarriage, the systems and methods provide data that was previously unavailable using conventional methods such as indicating leaks and/or faults in a variety of interior vehicle systems (e.g., transmission, differential, oil filtration, radiator, engine, etc.). Hence, these advantageous features collectively facilitate more accurate, detailed, and expeditious claim processing. Correspondingly, the more accurately and efficiently an evaluating entity (e.g., insurance company) can pay/process claims, the more satisfied customers may be through receiving lower rates with a higher level of service. Other advantages will be recognized by one of ordinary skill in the art in light of the teaching and disclosure herein.

As will be apparent from the above description, and as should be appreciated with respect to all examples presented herein, the functions or operations shown in FIG. 5 may be performed in any suitable order, any desired number of times, and/or with any suitable variation to the particular order and/or combination shown so as to achieve a desired result, such as a desired manner of analyzing vehicle image data captured by a portable imaging gate apparatus 110.

IV. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the user electronic device 104, the provider server 106, the external processing server 108, the imaging gate apparatus 110, and/or any other computing devices within the example system 100 in any suitable combination). The routines may be included as part of any of the modules described in relation to FIG. 1 and/or FIG. 2 or as part of a module that is external to the system illustrated by FIG. 1 and/or FIG. 2. For example, the methods or portions thereof may be part of a browser application(s) or an application(s) running on any of the devices in the example system 100 as a plug-in or other module of the browser application. Further, the methods may be employed as "software-as-a-service" to provide, for example, the user electronic device 104, the provider server 106, the external processing server 108, the imaging gate apparatus 110, and/or any other computing devices with access to the example system 100 and/or example system 200.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic region (e.g., within a home environment, an office environment, or a server farm). In other example embodiments, the one or more processors or processor-implemented modules may be distributed across a number of geographic regions.

Still further, the figures depict preferred embodiments of an example system 100 and/or example system 200 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a systems and methods for analyzing vehicle image data captured by a portable imaging gate apparatus. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The patent claims at the end of this patent application are not intended to be construed under 35 U.S.C. § 112(f) unless traditional means-plus-function language is expressly recited, such as "means for" or "step for" language being explicitly recited in such claims. The systems and methods described herein are directed to an improvement to computer functionality, and improve the functioning of conventional computers.

What is claimed is:

1. A vehicle image analysis apparatus comprising:
   one or more processors configured to:
      receive vehicle image data of a vehicle captured by a portable imaging gate apparatus, wherein the portable imaging gate apparatus includes a plurality of imaging assemblies positioned at a plurality of viewing angles, and wherein each imaging assembly of the plurality of imaging assemblies includes one or more imaging devices and is configured to capture respective vehicle image data from a respective viewing angle of the plurality of viewing angles;
      analyze the vehicle image data to identify one or more vehicle features;
      determine a first vehicle feature from the one or more vehicle features; and
      update a risk evaluation based at least on the first vehicle feature.

2. The vehicle image analysis apparatus of claim 1, wherein the plurality of viewing angles include one or more viewing angles featuring an undercarriage of the vehicle.

3. The vehicle image analysis apparatus of claim 1, wherein each imaging assembly of the plurality of imaging assemblies is adjustably connected to the portable imaging gate apparatus.

4. The vehicle image analysis apparatus of claim 1, wherein the one or more imaging devices are configured to capture the respective vehicle image data using at least one selected from a group consisting of visible light imaging, infrared imaging, and x-ray imaging.

5. The vehicle image analysis apparatus of claim 1, wherein the one or more processors are further configured to:
   receive geolocation information of the portable imaging gate apparatus;
   analyze the geolocation information to determine if the portable imaging gate apparatus is in one of one or more secure locations; and
   determine the portable imaging gate apparatus is in one of the one or more secure locations.

6. The vehicle image analysis apparatus of claim 1, wherein an insurance policy is generated based on the risk evaluation, and updating the risk evaluation includes updating one or more of (i) a cost associated with the insurance policy, (ii) a premium associated with the insurance policy, (iii) a deductible associated with the insurance policy, (iv) a discount associated with the insurance policy, or (v) a coverage level associated with the insurance policy.

7. A vehicle image data analysis method comprising:
   receiving vehicle image data of a vehicle captured by a portable imaging gate apparatus, wherein the portable imaging gate apparatus includes a plurality of imaging assemblies positioned at a plurality of viewing angles, and wherein the portable imaging gate apparatus includes a plurality of imaging apparatuses, and each imaging apparatus of the plurality of imaging apparatuses includes one or more imaging devices and is configured to capture respective vehicle image data from a respective viewing angle of the plurality of viewing angles;
   analyzing, by one or more processors, the vehicle image data to identify one or more vehicle features;
   determining, by the one or more processors, a first vehicle feature from the one or more vehicle features;
   updating, by the one or more processors, a risk evaluation based at least on the first vehicle feature; and
   generating, by the one or more processors, an insurance policy based on the risk evaluation.

8. The vehicle image data analysis method of claim 7, wherein updating the risk evaluation includes updating one or more of (i) a cost associated with the insurance policy, (ii) a premium associated with the insurance policy, (iii) a deductible associated with the insurance policy, (iv) a discount associated with the insurance policy, or (v) a coverage level associated with the insurance policy.

9. The vehicle image data analysis method of claim 7, wherein the plurality of viewing angles include one or more viewing angles featuring an undercarriage of the vehicle.

10. The vehicle image data analysis method of claim 7, wherein each imaging apparatus of the plurality of imaging apparatuses is adjustably connected to the portable imaging gate apparatus.

11. The vehicle image data analysis method of claim 9, wherein the one or more imaging devices are configured to capture the respective vehicle image data using at least one selected from a group consisting of visible light imaging, infrared imaging, and x-ray imaging.

12. The vehicle image data analysis method of claim 7, wherein the vehicle image data is still image data or video data.

13. The vehicle image data analysis method of claim 7, further comprising:
   receiving geolocation information of the portable imaging gate apparatus;
   analyzing the geolocation information to determine if the portable imaging gate apparatus is in one of one or more secure locations; and determining the portable imaging gate apparatus is in one of the one or more secure locations.

14. A non-transitory computer readable storage medium comprising instructions stored thereon for analyzing vehicle image data, wherein the instructions when executed by one or more processors cause the one or more processors to:
receive the vehicle image data of a vehicle captured by a portable imaging gate apparatus, wherein the portable imaging gate apparatus includes a plurality of imaging assemblies positioned at a plurality of viewing angles, and wherein each imaging assembly of the plurality of imaging assemblies includes one or more imaging devices and is configured to capture respective vehicle image data from a respective viewing angle of the plurality of viewing angles;
analyze the vehicle image data to identify a plurality of vehicle features;
determine a first vehicle feature from the plurality of vehicle features, wherein the first vehicle feature is related to a vehicle incident; and
update a risk evaluation based at least on the first vehicle feature.

15. The non-transitory computer readable storage medium of claim 14, wherein the instructions when executed by the one or more processors further cause the one or more processors to:
generate an insurance policy based on the risk evaluation; and
update the risk evaluation by updating one or more of (i) a cost associated with the insurance policy, (ii) a premium associated with the insurance policy, (iii) a deductible associated with the insurance policy, (iv) a discount associated with the insurance policy, or (v) a coverage level associated with the insurance policy.

16. The non-transitory computer readable storage medium of claim 14, wherein the instructions when executed by the one or more processors further cause the one or more processors to:
receive geolocation information of the portable imaging gate apparatus;
analyze the geolocation information to determine if the portable imaging gate apparatus is in one of one or more secure locations; and
determine the portable imaging gate apparatus is in one of the one or more secure locations.

17. The non-transitory computer readable storage medium of claim 14, wherein the plurality of viewing angles include one or more viewing angles featuring an undercarriage of the vehicle.

18. The non-transitory computer readable storage medium of claim 14, wherein each imaging assembly of the plurality of imaging assemblies is adjustably connected to the portable imaging gate apparatus.

19. The non-transitory computer readable storage medium of claim 14, wherein the one or more imaging devices are configured to capture the respective vehicle image data using at least one selected from a group consisting of visible light imaging, infrared imaging, and x-ray imaging.

* * * * *